(12) United States Patent
Kumagai et al.

(10) Patent No.: US 12,258,890 B2
(45) Date of Patent: Mar. 25, 2025

(54) CATALYST DETERIORATION DIAGNOSIS DEVICE

(71) Applicant: YAMAHA HATSUDOKI KABUSHIKI KAISHA, Iwata (JP)

(72) Inventors: Kenichi Kumagai, Shizuoka (JP); Yuta Shimizu, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 0 days.

(21) Appl. No.: 18/545,265

(22) Filed: Dec. 19, 2023

(65) Prior Publication Data
US 2024/0200484 A1  Jun. 20, 2024

(30) Foreign Application Priority Data

Dec. 19, 2022 (WO) .................. PCT/JP2022/046658
Apr. 11, 2023 (JP) ................................ 2023-063947

(51) Int. Cl.
*F01N 11/00* (2006.01)
(52) U.S. Cl.
CPC ........ *F01N 11/007* (2013.01); *F01N 2550/02* (2013.01); *F01N 2560/025* (2013.01)
(58) Field of Classification Search
CPC .. F01N 11/007; F01N 2560/025; F01N 3/101; F01N 11/00; F01N 11/002; F01N 2430/06; F01N 2570/16
See application file for complete search history.

(56) References Cited

U.S. PATENT DOCUMENTS

2007/0261390 A1* 11/2007 Chino .................. F01N 11/007
60/285

2009/0145110 A1* 6/2009 Fukuchi ................ F01N 11/007
60/277

FOREIGN PATENT DOCUMENTS

| DE | 19539024 A1 | 4/1996 |
| DE | 102019006426 A1 | 3/2020 |
| JP | H05321748 A | 12/1993 |
| JP | H0754705 A | 2/1995 |
| JP | 2841823 B2 | 10/1998 |
| JP | 2841825 B2 | 12/1998 |

(Continued)

OTHER PUBLICATIONS

International Search Report and Written Opinion for PCT/JP2022/046657, mailed on Mar. 7, 2023.

(Continued)

*Primary Examiner* — Anthony Ayala Delgado
(74) *Attorney, Agent, or Firm* — Rabin & Berdo, P.C.

(57) ABSTRACT

A catalyst deterioration diagnosis device, including: a processor to execute, when a cycle of reversal between increasing and decreasing of a fuel amount is disturbed such that the increasing/decreasing of the fuel amount is reversed three or more times in a period that is identical in length with a period in which the increasing/decreasing of the fuel amount is reversed twice when the reversal between increasing and decreasing of the fuel amount is normal, a process of diagnosing the deterioration state of a catalyst based on plural sets of data of the output signal of a downstream oxygen concentration sensor obtained in each unit period during a diagnosis period. The sets of data obtained in each unit period during the diagnosis period is not susceptible to an influence of variations including both increase and decrease of the output signal of the downstream oxygen concentration sensor.

6 Claims, 6 Drawing Sheets

(56) References Cited

FOREIGN PATENT DOCUMENTS

| | | |
|---|---|---|
| JP | 3181113 B2 | 7/2001 |
| JP | 2007292014 A | 11/2007 |
| JP | 2020133467 A | 8/2020 |
| JP | 2021032115 A | 3/2021 |
| JP | 2022108222 A | 7/2022 |
| WO | 2016194953 A1 | 12/2016 |
| WO | 2017208757 A1 | 12/2017 |
| WO | 2021019760 A1 | 2/2021 |
| WO | 2021182584 A1 | 9/2021 |

OTHER PUBLICATIONS

International Search Report and Written Opinion for PCT/JP2022/046658, mailed on Jan. 31, 2023.

* cited by examiner

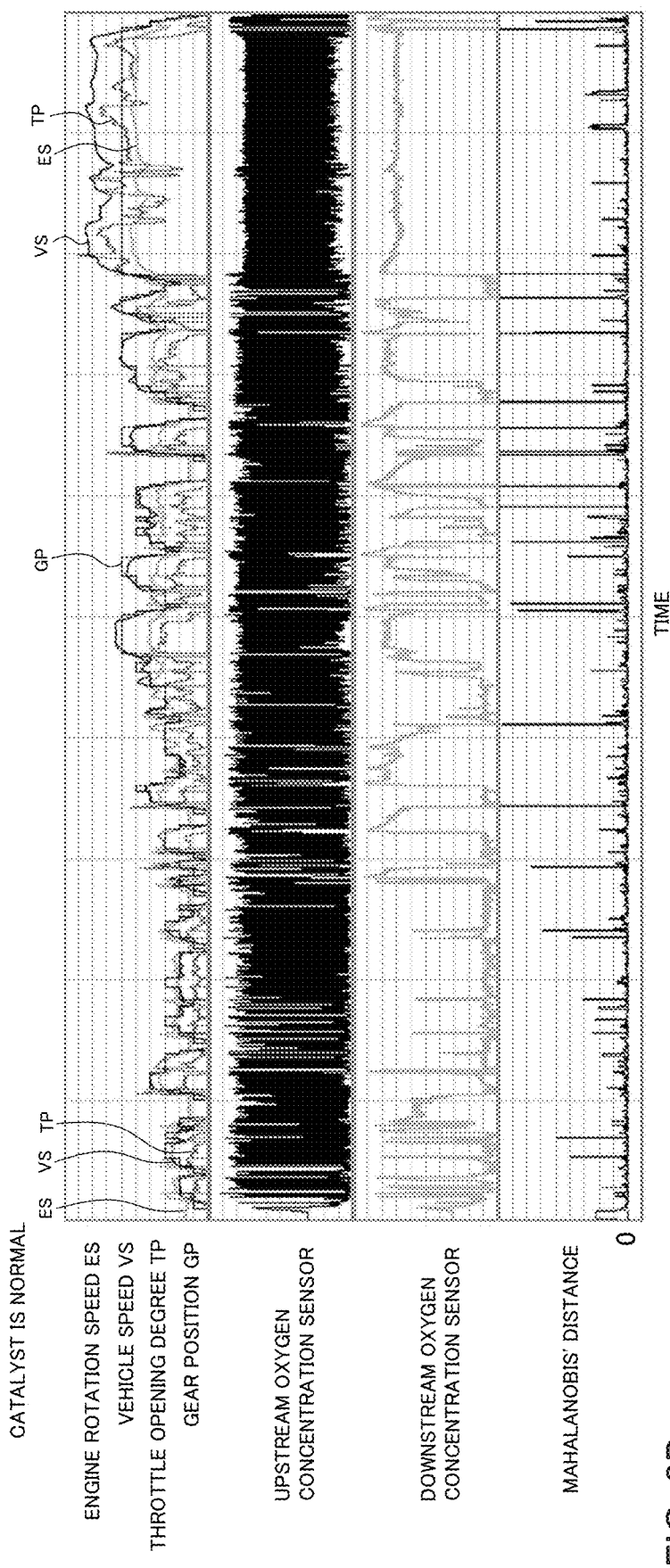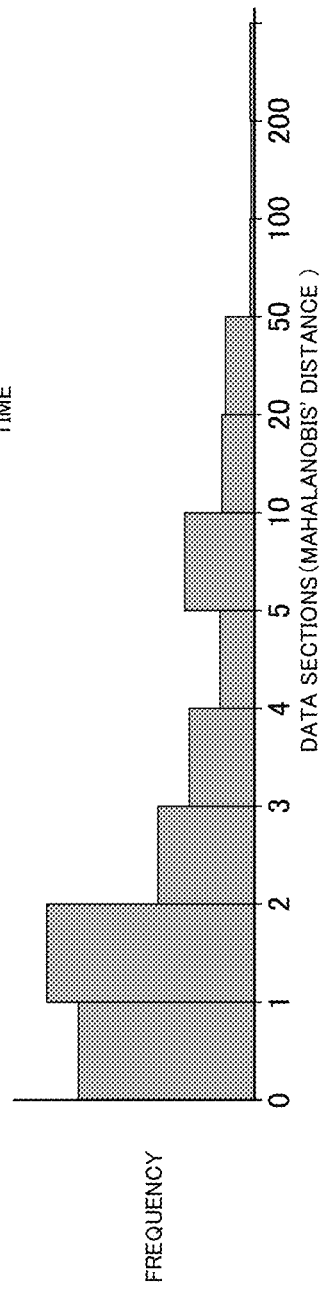

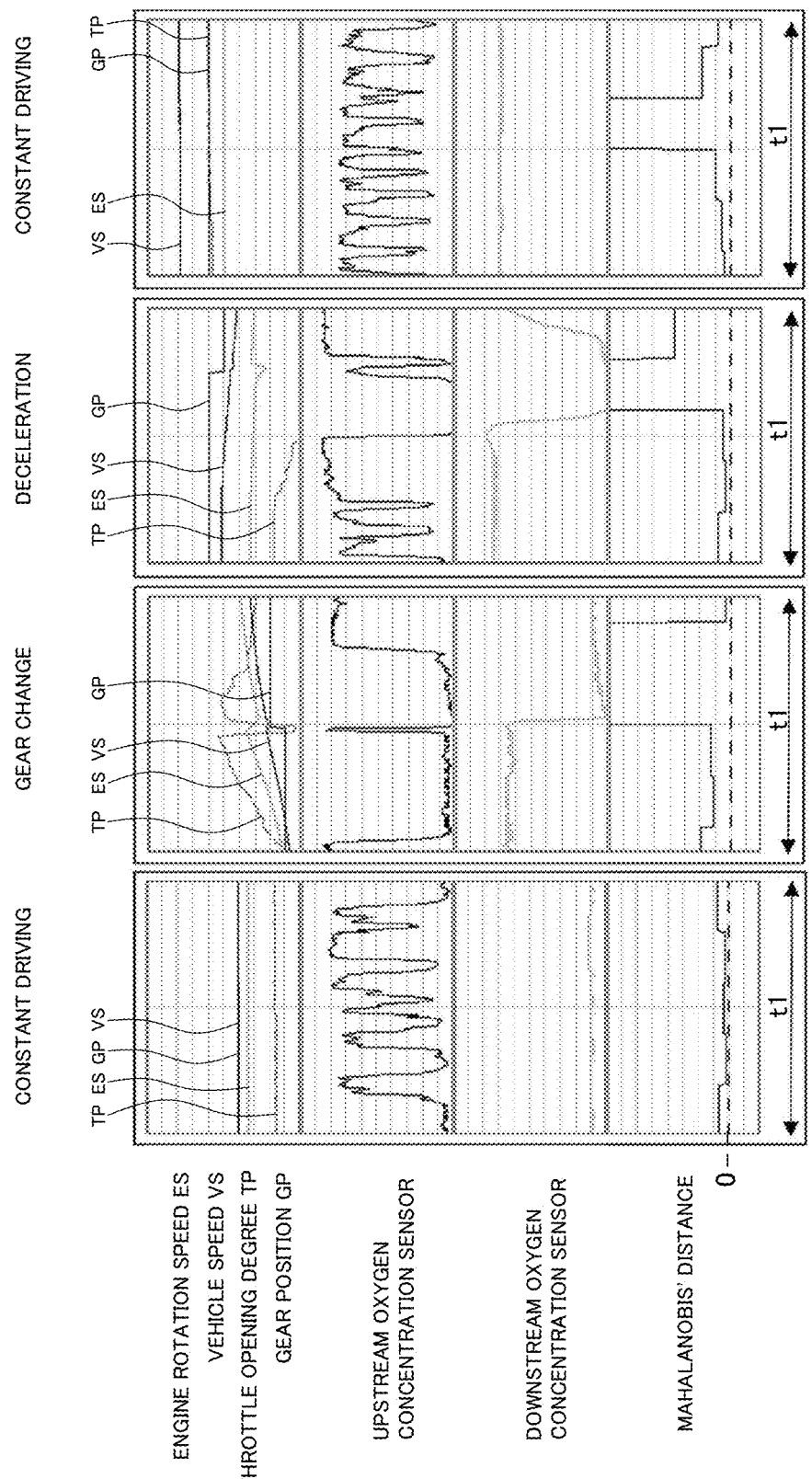

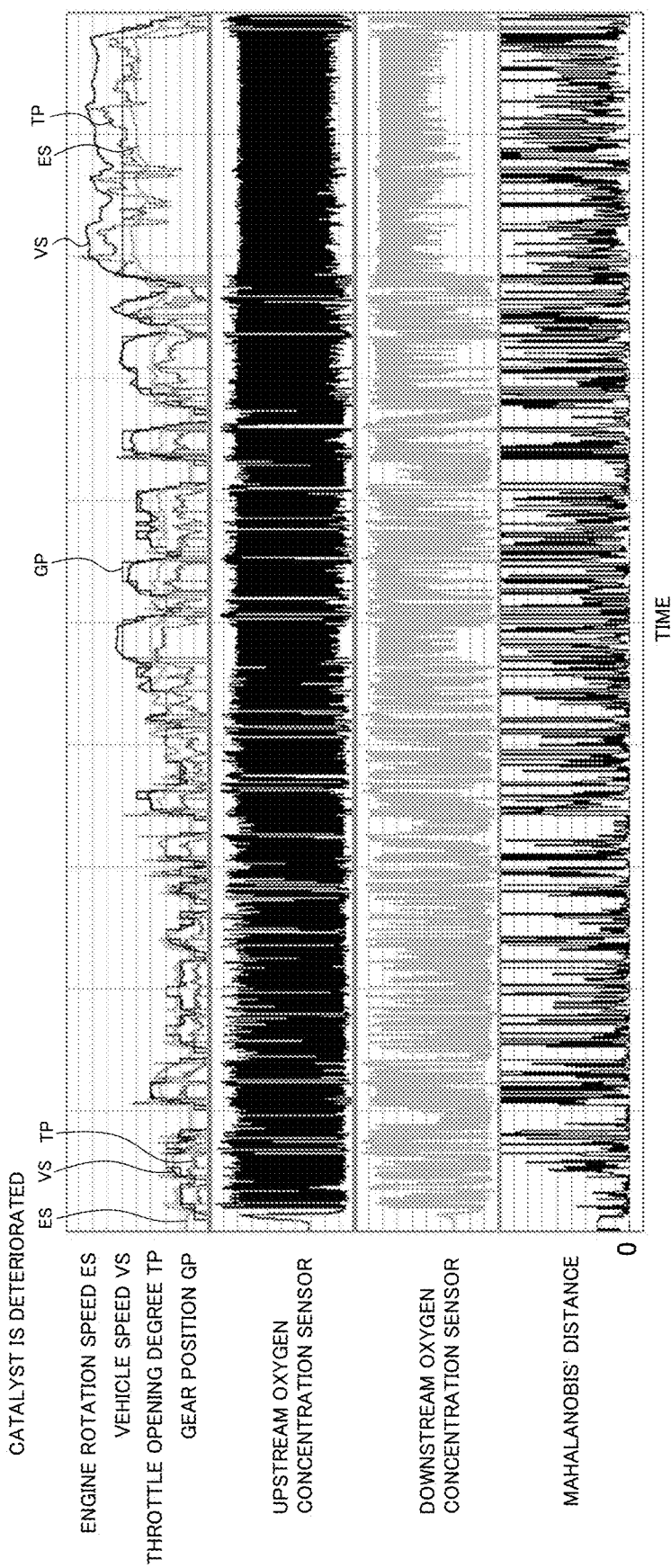
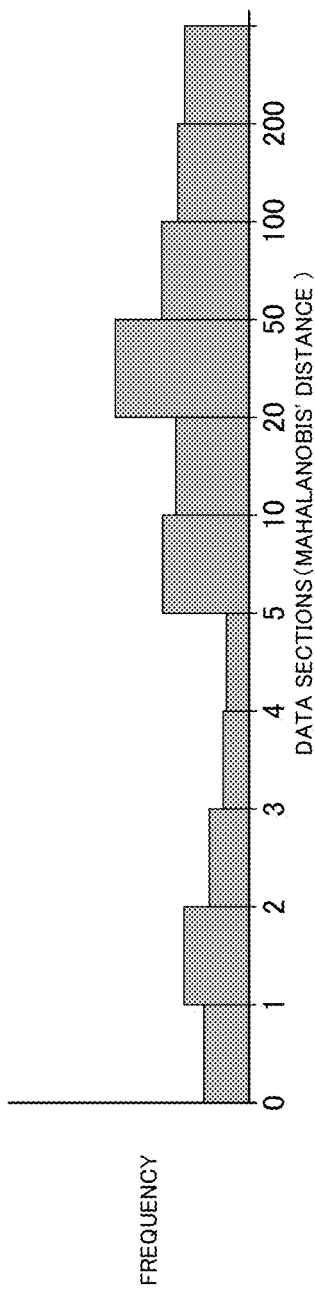
FIG. 5A
FIG. 5B

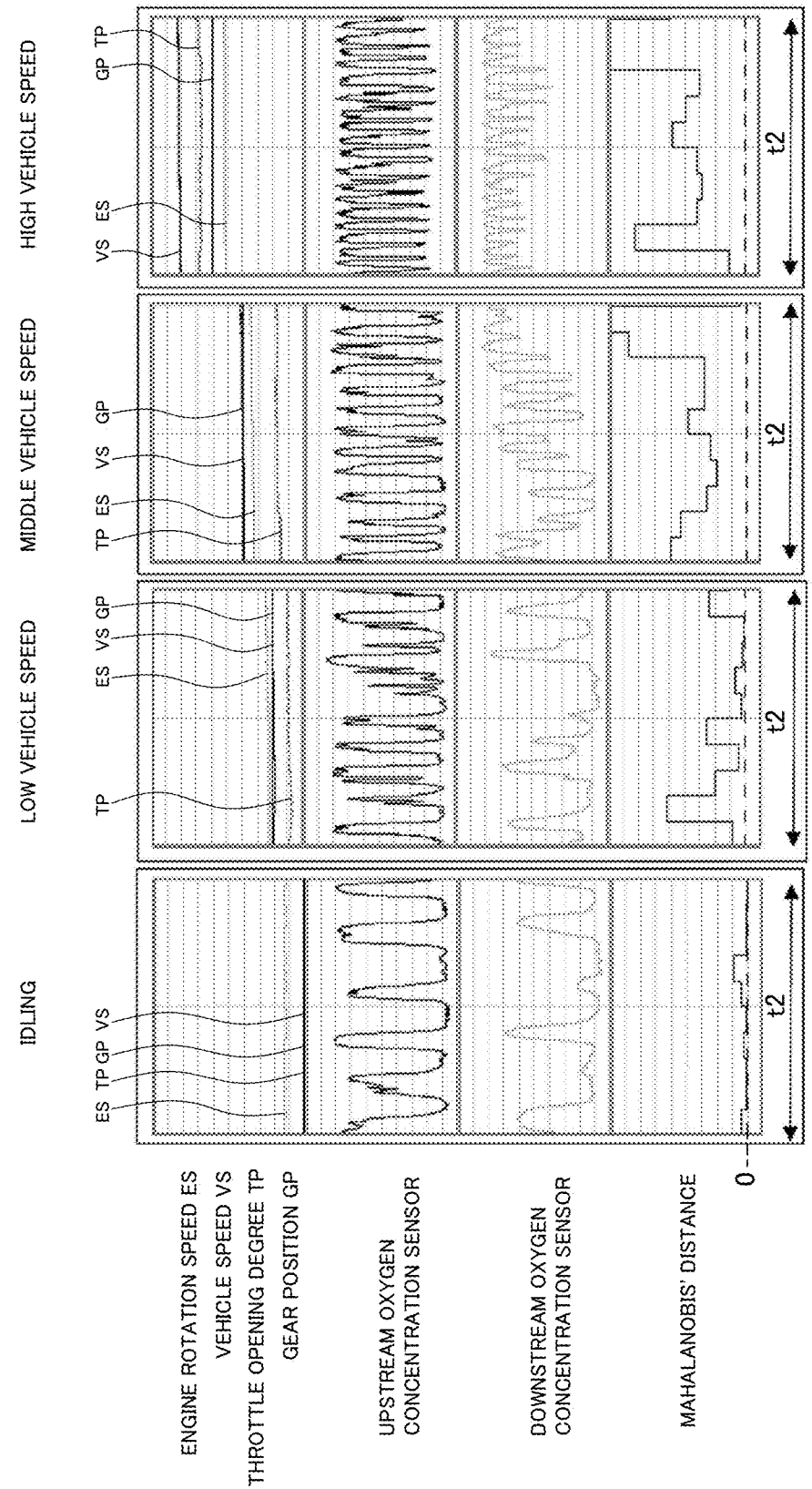

CATALYST DETERIORATION DIAGNOSIS DEVICE

CROSS-REFERENCES TO RELATED APPLICATIONS

This application is based on, and claims the benefit of priority to, International Application No. PCT/JP2022/046658, filed on Dec. 19, 2022, and Japanese Patent Application No. 2023-063947, filed on Apr. 11, 2023. The contents of the applications are incorporated herein by reference.

BACKGROUND OF THE INVENTION

The present teaching relates to a catalyst deterioration diagnosis device configured to diagnose the deterioration state of a catalyst which purifies exhaust gas exhausted from an engine.

A catalyst deterioration diagnosis device configured to diagnose the deterioration state of a catalyst which purifies exhaust gas exhausted from an engine has been known. For example, in Patent Literature 1 (Japanese Patent No. 2841823), an upstream oxygen concentration sensor (first O2 sensor) and a downstream oxygen concentration sensor (second O2 sensor) are provided upstream and downstream of a catalyst in the flow direction of exhaust gas, respectively. When the rich/lean state of an output signal of the upstream oxygen concentration sensor is reversed, the catalyst deterioration diagnosis device counts the duration of the rich/lean state, and drives the engine in such a way that the increasing/decreasing tendency of a fuel amount supplied to a combustion chamber is reversed when the duration reaches a predetermined delay time. While the reversal between increasing and decreasing tendencies of the fuel amount is controlled based on the rich/lean state of the output signal of the upstream oxygen concentration sensor, the diagnosis of deterioration of the catalyst is performed based on a difference in response delay time between the output signal of the upstream oxygen concentration sensor and the output signal of the downstream oxygen concentration sensor. Patent Literature 1 recites that the diagnosis of deterioration of the catalyst is performed based on an arrangement in which the cycle of increase and decrease of a feedback correction coefficient is longer than the cycle in normal emission control.

SUMMARY OF THE INVENTION

In Patent Literature 1, the cycle of reversal of the rich/lean state of the output signal of the upstream oxygen concentration sensor may be disturbed depending on the configuration or use of the engine. In this regard, in Patent Literature 1, as described above, the engine is driven in such a way that the increasing/decreasing tendency of a fuel amount supplied to a combustion chamber is reversed when the duration reaches a predetermined delay time. With this arrangement, when the cycle of reversal of the rich/lean state f the output signal of the upstream oxygen concentration sensor is disturbed so that the rich/lean state of the output signal of the upstream oxygen concentration sensor is reversed and then the rich/lean state of the output signal of the upstream oxygen concentration sensor is reversed again before the delay time elapses, the increasing/decreasing tendency of the fuel amount is not reversed and the cycle of the reversal between increasing and decreasing tendencies of the fuel amount is not disturbed. However, in Patent Literature 1, when the cycle of reversal of the rich/lean state of the output signal of the upstream oxygen concentration sensor is disturbed so that the rich/lean state of the output signal of the upstream oxygen concentration sensor is reversed and then the rich/lean state of the output signal of the upstream oxygen concentration sensor is reversed again after the delay time elapses, the increasing/decreasing tendency of the fuel amount is reversed, with the result that the cycle of the reversal between increasing and decreasing tendencies of the fuel amount is disturbed. To solve this problem, for example, the delay time may be elongated to suppress the disturbance of the cycle of the reversal between increasing and decreasing tendencies of the fuel amount when the cycle of reversal of the rich/lean state of the output signal of the upstream oxygen concentration sensor is disturbed. However, when the delay time is elongated, because the increasing/decreasing tendency of the fuel amount is not reversed while the rich/lean state of the output signal of the upstream oxygen concentration sensor is reversed in a normal manner, the cycle of reversal between increasing and decreasing tendencies of the fuel amount is likely to be disturbed.

There have been demands for a catalyst deterioration diagnosis device that is able to diagnose the deterioration state of a catalyst even when the cycle of reversal between increasing and decreasing tendencies of a fuel amount is disturbed due to the disturbance in the cycle of reversal of the rich/lean state of the output signal of the upstream oxygen concentration sensor.

An object of the present teaching is to provide a catalyst deterioration diagnosis device that is able to diagnose the deterioration state of a catalyst even when the cycle of reversal between increasing and decreasing tendencies of a fuel amount is disturbed due to the disturbance in the cycle of reversal of an output signal of an upstream oxygen concentration sensor.

A catalyst deterioration diagnosis device of an embodiment of the present teaching is structured as described below.

The catalyst deterioration diagnosis device for an engine-including device including: an engine having an combustion chamber that exhaust gas; a catalyst which is configured to purify the exhaust gas exhausted from the combustion chamber of the engine; an upstream oxygen concentration sensor provided upstream of the catalyst in a flow direction of the exhaust gas and configured to output a signal that varies in value depending on whether an air-fuel ratio of an air-fuel mixture is rich or lean and that does not gradually vary when the air-fuel ratio of the air-fuel mixture gradually varies; and a downstream oxygen concentration sensor provided downstream of the catalyst in the flow direction of the exhaust gas, the catalyst deterioration diagnosis device being configured to diagnose a state of deterioration of the catalyst in accordance with an output signal of the downstream oxygen concentration sensor when the engine is driven so that reversal between increasing and decreasing of a fuel amount supplied to the engine is performed based on reversal of a rich/lean state of an output signal of the upstream oxygen concentration sensor, the catalyst deterioration diagnosis device comprising: a processor, and a non-transitory storage medium having program instructions stored thereon, when, because a cycle of reversal of the rich/lean state of the output signal of the upstream oxygen concentration sensor is disturbed such that the rich/lean state of the output signal of the upstream oxygen concentration sensor is reversed three or more times in a period that is identical in length with a period in which the rich/lean state of the output signal of the upstream oxygen concentration sensor is reversed twice when the cycle of reversal of the rich/lean state of the output signal of the upstream oxygen concentration sensor is normal, a cycle of reversal between increasing and decreasing of the fuel amount is disturbed such that an increasing/decreasing of the fuel amount is reversed three or more times in a period that is identical in length with a period in which the increasing/decreasing tendency of the fuel amount is reversed twice when the reversal between increasing and decreasing of the fuel amount is normal, the processor being configured to execute at least a diagnosis process of diagnosing the deterioration state of the catalyst based on plural sets of data of the output signal of the downstream oxygen concentration sensor obtained in each unit period during a diagnosis period, the diagnosis period being a duration in which the rich/lean state of the output signal of the upstream oxygen concentration sensor is reversed at least twice when the cycle of reversal of the rich/lean state of the output signal of the upstream oxygen concentration sensor is normal, the diagnosis period having a length with which one driving cycle includes plural diagnosis periods, the sets of data obtained in each unit period during the diagnosis period being not susceptible to an influence of variations including both increase and decrease of the output signal of the downstream oxygen concentration sensor, and the output signal of the downstream oxygen concentration sensor being influenced by disturbance of the reversal between increasing and decreasing of the fuel amount.

In this arrangement, the catalyst deterioration diagnosis device is configured to diagnose the deterioration state of the catalyst based on plural sets of data of the output signal of the downstream oxygen concentration sensor. The sets of data are obtained in each unit period during the diagnosis period, and the output signal of the downstream oxygen concentration sensor is influenced by the disturbance of the cycle of reversal between increasing and decreasing tendencies of the fuel amount during the diagnosis period. The diagnosis period is a duration in which the rich/lean state of the output signal of the upstream oxygen concentration sensor is reversed at least twice when the cycle of reversal of the rich/lean state of the upstream oxygen concentration sensor is normal, and the diagnosis period is a relatively long period so that one driving cycle includes plural diagnosis periods. Even when the cycle of reversal between increasing and decreasing tendencies of the fuel amount is disturbed, a characteristic with which the deterioration state of the catalyst can be determined appears in the output signal of the downstream oxygen concentration sensor in the diagnosis period that is a relatively long period. On this account, the state of deterioration of the catalyst can be diagnosed even if the cycle of reversal between increasing and decreasing tendencies of the fuel amount is disturbed.

In the present arrangement, because the diagnosis period is relatively long, the state of deterioration of the catalyst can be easily diagnosed by using, for example, pattern recognition, when the deterioration state of the catalyst is diagnosed based on plural sets of data of the output signal of the downstream oxygen concentration sensor, the sets of data being obtained in each unit period during the diagnosis period, and the output signal being influenced by the disturbance of the cycle of reversal between increasing and decreasing tendencies of the fuel amount during the diagnosis period.

Furthermore, in the present arrangement, it is possible to diagnose the deterioration state of the catalyst without increasing the cycle and amplitude of the increasing/decreasing tendency of the fuel amount so much, as compared to cases where the diagnosis is performed based on a delay time of the output signal of the downstream oxygen concentration sensor from the output signal of the upstream oxygen concentration sensor.

The catalyst deterioration diagnosis device of the embodiment of the present teaching may be structured as described below.

A determination value that is obtained from the plural sets of data obtained in each unit period during the diagnosis period and is used for diagnosing the deterioration state of the catalyst is a single value.

In this arrangement, because the determination value that is obtained from the plural sets of data obtained in each unit period during the diagnosis period and is used for diagnosing the deterioration state of the catalyst is a single value, the state of deterioration of the catalyst is easily diagnosed as compared to cases where the number of determination values used for diagnosing the state of deterioration of the catalyst is two or more.

The catalyst deterioration diagnosis device of the embodiment of the present teaching may be structured as described below.

The determination value is a value reflecting plural types of characteristic amounts related to a variation of the output signal of the downstream oxygen concentration sensor.

In this arrangement, it is possible to easily and precisely diagnose the state of deterioration of the catalyst based on a single determination value to which plural types of characteristic amounts regarding a variation of the output signal of the downstream oxygen concentration sensor are reflected.

The catalyst deterioration diagnosis device of the embodiment of the present teaching may be structured as described below.

The determination value is a composite index of the plural types of the characteristic amounts.

In this arrangement, it is possible to easily and precisely diagnose the state of deterioration of the catalyst based on the composite index of the plural types of the characteristic amounts.

The catalyst deterioration diagnosis device of the embodiment of the present teaching may be structured as described below.

After a first diagnosis condition is satisfied, the state of deterioration of the catalyst is diagnosed based on the output signal of the downstream oxygen concentration sensor, after a cycle of reversal between increasing and decreasing of the fuel amount is controlled to fall within a first range by performing diagnosis reversal control of controlling the cycle of reversal between increasing and decreasing of the fuel amount to be a cycle falling within the first range, wherein the first diagnosis condition does not include a condition in which the cycle of reversal between increasing and decreasing of the fuel amount falls within the first range.

In this arrangement, the diagnosis reversal control is performed when the state of deterioration of the catalyst is diagnosed. Due to this, the time required for the diagnosis is shortened by suppressing variations in reversal between increasing and decreasing tendencies of the fuel amount, as compared to cases where the diagnosis reversal control is not performed when the state of deterioration of the catalyst is diagnosed.

Due to an influence of, for example, blowby gas, canister purge, and differences in air-fuel ratio between cylinders when the engine is a multi-cylinder engine, a deviation may occur between whether the output signal of the upstream oxygen concentration sensor is in the rich state or the lean state and whether the air-fuel ratio of the air-fuel mixture is actually rich or lean, with the result that a timing of reversal between increasing and decreasing tendencies of the fuel amount may be varied due to the deviation. In this case, variations of the output signal of the downstream oxygen concentration sensor may become significant. According to the arrangement above, because the diagnosis reversal control is performed when the state of deterioration of the catalyst is diagnosed, the variations of the output signal of the downstream oxygen concentration sensor are suppressed as compared to cases where the diagnosis reversal control is not performed when the state of deterioration of the catalyst is diagnosed. On this account, while the diagnosis accuracy of the state of deterioration of the catalyst is maintained to be as good as the diagnosis accuracy in cases where the diagnosis reversal control is not performed, variations in the output signal of the downstream oxygen concentration sensor are suppressed and the time required for the diagnosis is shortened, as compared to the cases where the diagnosis reversal control is not performed in the diagnosis of the state of deterioration of the catalyst.

The catalyst deterioration diagnosis device of the embodiment of the present teaching may be structured as described below.

When control of reversal between increasing and decreasing tendencies of the fuel amount to be a cycle falling within a first range is defined as diagnosis reversal control, after a second diagnosis condition is satisfied, while the diagnosis reversal control is not being performed, the state of deterioration of the catalyst is diagnosed based on the output signal of the downstream oxygen concentration sensor, wherein the second diagnosis condition includes a condition in which the cycle of reversal between increasing and decreasing of the fuel amount falls within a second range that is shorter than the cycle in the first range.

According to the arrangement above, because the diagnosis reversal control is not performed when the state of deterioration of the catalyst is diagnosed, it is possible to diagnose the deterioration state of the catalyst without increasing the cycle and amplitude of reversal between increasing and decreasing of the fuel amount so much, as compared to cases where the diagnosis reversal control is performed when the state of deterioration of the catalyst is diagnosed.

Furthermore, in the arrangement above, because the diagnosis reversal control is not performed when the state of deterioration of the catalyst is diagnosed, the computing load of the processor is reduced and the degree of freedom in designing the hardware resource is improved, as compared to cases where the diagnosis reversal control is performed when the state of deterioration of the catalyst is diagnosed.

When the catalyst deterioration diagnosis device performs the diagnosis reversal control when diagnosing the state of deterioration of the catalyst, a setting value for the diagnosis of the deterioration state of the catalyst must be set based on data collected by performing a test of the diagnosis reversal control. On the other hand, according to the arrangement above, because the diagnosis reversal control is not performed when the deterioration state of the catalyst is diagnosed, it is possible to set a setting value for the diagnosis of the deterioration state of the catalyst based on data which is collected by another test that is, for example, a test of whether the purification performance of purifying the exhaust gas satisfies a predetermined condition. It is therefore unnecessary in the arrangement above to collect data by performing a test of the diagnosis reversal control, and hence the development man-hour is decreased as compared to cases where the diagnosis reversal control is performed when the state of deterioration of the catalyst is diagnosed.

Furthermore, in the arrangement above, because the diagnosis reversal control is not performed when the state of deterioration of the catalyst is diagnosed, it is unnecessary to include a step of adjusting the cycle and amplitude of reversal between increasing and decreasing of the fuel amount in the diagnosis reversal control. Due to this, according to the arrangement above, the development man-hour is decreased as compared to cases where the diagnosis reversal control is performed when the state of deterioration of the catalyst is diagnosed.

In the present teaching and embodiments, the engine may be a four-stroke engine or a two-stroke engine. The engine may or may not include a canister. The engine may or may not include a forced induction device. The forced induction device may be a turbocharger or a supercharger. The engine may be a single-cylinder engine having one combustion chamber or a multi-cylinder engine having plural combustion chambers. The arrangement of the cylinders (combustion chambers) in the multi-cylinder engine is not particularly limited. In the multi-cylinder engine, the cycle of reversal between increasing and decreasing of a fuel amount supplied to each combustion chamber is substantially identical between the combustion chambers. A timing of fuel supply may be different between the combustion chambers. When the number of the combustion chambers is four or more, a timing of fuel supply may be identical between two of the combustion chambers.

In the present teaching and embodiments, an engine-including device is not limited to any particular devices. For example, the engine-including device may be a vehicle. The vehicle may or may not include a wheel. The vehicle may encompass a straddled vehicle. The straddled vehicle indicates all types of vehicles on which a rider (driver) rides in a manner of straddling a saddle. The straddled vehicle includes a motorcycle, a motor tricycle, a four-wheeled buggy (ATV: All Terrain Vehicle), a snowmobile, and a personal watercraft, for example. The vehicle may be an automobile, a ship, or a flying object such as a drone.

In the present teaching and embodiments, a catalyst is configured to purify exhaust gas exhausted from a combustion chamber of an engine. In the present teaching and embodiments, examples of the catalyst includes a three way catalyst (TWC), an oxidation catalyst (DOC), an NOX selective catalytic reduction (SCR) catalyst, and a lean NOx trap (LNT) catalyst. The three way catalyst is a catalyst which is configured to mainly remove atmospheric pollutant that is three materials in exhaust gas, i.e., hydrocarbon (HC), carbon monoxide (CO), and nitrogen oxide (NOx), by oxidation or reduction. The three way catalyst is, for example, a catalyst including platinum (Pt), palladium (Pd), and rhodium (Rh). The three way catalyst purifies exhaust gas by oxidizing or reducing hydrocarbon to water and carbon dioxide, carbon monoxide to carbon dioxide, and nitrogen oxide to nitrogen. The NOx selective catalytic reduction (SCR) catalyst includes at least one element selected from a group consisting of metal-substituted zeolite, vanadium, titania, tungsten oxide, silver, and alumina. The lean NOx trap catalyst includes, for example, alkali metal and/or alkali earth metal. Examples of the alkali metal include potassium, natrium, and lithium. An example of the alkali earth metal is calcium. The catalyst may be a catalyst which removes one or two of hydrocarbon, carbon monoxide, and nitrogen oxide. The catalyst may not be an oxidation-reduction catalyst. The catalyst may be an oxidation catalyst or a reduction catalyst which removes atmospheric pollutant by only either oxidation or reduction. The catalyst is arranged so that noble metal having an exhaust gas purification effect is adhered to a base. The catalyst may be a catalyst with a metal base or a catalyst with a ceramic base.

In the present teaching and embodiments, each of an upstream oxygen concentration sensor and a downstream oxygen concentration sensor is configured to detect the oxygen concentration in exhaust gas exhausted from a combustion chamber of an engine. Hereinafter, the upstream oxygen concentration sensor and the downstream oxygen concentration sensor may be collectively termed as oxygen concentration sensors. The upstream oxygen concentration sensor is an O2 sensor. The downstream oxygen concentration sensor encompasses an O2 sensor and a linear A/F sensor. The O2 sensor is configured to detect that the oxygen concentration in the exhaust gas is higher than a first concentration and is lower than a second concentration. The first concentration is higher than or equal to the second concentration. The linear A/F sensor is configured to continuously detect changes of the oxygen concentration in the exhaust gas.

Based on an output signal of the upstream oxygen concentration sensor, it is possible to detect whether an air-fuel ratio of an air-fuel mixture is rich or lean. When the air-fuel ratio of the air-fuel mixture is rich, fuel is excessive as compared to a target air-fuel ratio. When the air-fuel ratio of the air-fuel mixture is lean, air is excessive as compared to the target air-fuel ratio. The target air-fuel ratio may be a value or a range encompassing the stoichiometric air-fuel ratio, or may be a value or a range slightly deviated from the stoichiometric air-fuel ratio. When the air-fuel ratio of the air-fuel mixture is rich, the output signal of the upstream oxygen concentration sensor is in a rich state. When the air-fuel ratio of the air-fuel mixture is lean, the output signal of the upstream oxygen concentration sensor is in a lean state. When the output signal of the upstream oxygen concentration sensor is in the rich state, for example, a current value or a voltage value of the output signal is larger than a first value. In this case, the lean state of the output signal of the upstream oxygen concentration sensor indicates a state in which the voltage value or the current value of the output signal is smaller than a second value that is equal to or smaller than the first value. The oxygen concentration sensor has a sensor element composed of a solid electrolyte body mainly made of zirconia, for example. The oxygen concentration sensor is able to detect the oxygen concentration when the sensor element of the oxygen concentration sensor is heated to a high temperature and becomes activated.

In the present teaching and embodiments, the reversal of the rich/lean state of the output signal of the upstream oxygen concentration sensor indicates both (i) switching of the output signal of the upstream oxygen concentration sensor from the rich state indicating that the air-fuel ratio of the air-fuel mixture is rich to the lean state in which the air-fuel ratio of the air-fuel mixture is lean and (ii) switching of the output signal of the upstream oxygen concentration sensor from the lean state to the rich state. When the air-fuel ratio of the air-fuel mixture is switched from rich to lean, the output signal of the upstream oxygen concentration sensor is switched from the rich state to the lean state. When the air-fuel ratio of the air-fuel mixture is switched from lean to rich, the output signal of the upstream oxygen concentration sensor is switched from the lean state to the rich state.

In the present teaching and embodiments, the reversal between increasing and decreasing of the fuel amount indicates both (i) switching from a state in which a fuel amount supplied to a combustion chamber is increasing to a state in which the fuel amount is decreasing and (ii) switching from the state in which the fuel amount supplied to the combustion chamber is decreasing to the state in which the fuel amount is increasing. The reversal between increasing and decreasing of the fuel amount may indicate reversal between increasing and decreasing of a correction coefficient of the fuel amount. The reversal between increasing and decreasing of the correction coefficient of the fuel amount indicates both (i) switching from a state in which a correction coefficient of a fuel amount is increasing to a state in which the correction coefficient is decreasing and (ii) switching from the state in which the correction coefficient of the fuel amount is decreasing to the state in which the correction coefficient is increasing. The correction coefficient of the fuel amount is a correction coefficient relative to a basic fuel supply amount. For example, the basic fuel supply amount is multiplied by the correction coefficient.

In the present teaching and embodiments, for example, if, as in the known cases, the diagnosis of the deterioration state of the catalyst based on a delay time of the output signal of the downstream oxygen concentration sensor from the output signal of the upstream oxygen concentration sensor is possible when the increasing/decreasing tendency of the fuel amount is reversed in accordance with the reversal of the rich/lean state of the output signal of the upstream oxygen concentration sensor, the cycle of reversal of the rich/lean state of the output signal of the upstream oxygen concentration sensor is normal. In the present teaching and embodiments, a period in which the rich/lean state of the output signal of the upstream oxygen concentration sensor is reversed twice when the cycle of reversal of the rich/lean state of the output signal of the upstream oxygen concentration sensor is normal is a duration from a reversal of the rich/lean state of the output signal of the upstream oxygen concentration sensor to the next reversal of the rich/lean state of the output signal of the upstream oxygen concentration sensor when the cycle of reversal of the output signal of the upstream oxygen concentration sensor is normal.

In the present teaching and embodiments, when the cycle of reversal of the rich/lean state of the output signal of the upstream oxygen concentration sensor is disturbed such that the rich/lean state of the output signal of the upstream oxygen concentration sensor is reversed three or more times in a period that is identical in length with a duration in which the rich/lean state of the output signal of the upstream oxygen concentration sensor is reversed twice when the cycle of reversal of the rich/lean state of the output signal of the upstream oxygen concentration sensor is normal, an interval between the reversals of the rich/lean state of the output signal of the upstream oxygen concentration sensor is short as compared to the case where the cycle of reversal of the rich/lean state of the output signal of the upstream oxygen concentration sensor is normal. As described above, the cycle of reversal of the rich/lean state of the output signal of the upstream oxygen concentration sensor may be disturbed depending on the configuration or use of the engine.

In the present teaching and embodiments, the cycle of reversal between increasing and decreasing of the fuel amount is normal if the increasing/decreasing tendency of the fuel amount is reversed based on the reversal of the rich/lean state of the output signal of the upstream oxygen concentration sensor in the state in which the cycle of reversal of the rich/lean state of the output signal of the upstream oxygen concentration sensor is normal. In the present teaching and embodiments, the period in which the increasing/decreasing tendency of the fuel amount is reversed twice when the cycle of reversal between increasing and decreasing of the fuel amount is normal is a duration from a reversal between increasing and decreasing of the fuel amount to the next reversal between increasing and decreasing of the fuel amount when the cycle of reversal between increasing and decreasing of the fuel amount is normal.

In the present teaching and embodiments, one driving cycle is a duration from the start to stop of the engine.

In the present teaching and embodiments, a catalyst deterioration diagnosis device is a device which includes a processor and a storage device and is configured to perform at least diagnosis of deterioration of a catalyst described in the present teaching and the description. The catalyst deterioration diagnosis device is, for example, an ECU (Electronic Control Unit). The processor is configured to be able to perform control described in the claims. The processor encompasses a microcontroller, a central processing unit (CPU), a microprocessor, a multiprocessor, an application specific integrated circuit (ASIC), a programmable logic circuit (PLC), a field programmable gate array (FPGA), and any other circuits capable of performing the diagnosis of the state of deterioration of the catalyst and the fuel amount control described in the description. The storage device includes a non-transitory storage medium configured to store data and programs executed by a processor and a transitory storage medium configured to temporarily store data. The storage device encompasses semiconductor memories such as a resistor and a cash memory, a main memory (a main storage or a RAM), and a storage (an external storage device or an auxiliary storage device). In the present teaching and embodiments, the catalyst deterioration diagnosis device may be a device included in the engine-including device, or a device that is not included in the engine-including device and is capable of communicating with the engine-including device. When the catalyst deterioration diagnosis device is a device included in the engine-including device, the catalyst deterioration diagnosis device may control the fuel amount.

In the present teaching and embodiments, the catalyst deterioration diagnosis device is configured to diagnose the deterioration state of the catalyst based on the output signal of the downstream oxygen concentration sensor, which is influenced by the disturbance of the cycle of reversal between increasing and decreasing of the fuel amount.

In the present teaching and embodiments, the output signal of the downstream oxygen concentration sensor, which is influenced by the disturbance of the cycle of reversal between increasing and decreasing of the fuel amount, is the output signal of the downstream oxygen concentration sensor in which, on account of the disturbance of the cycle of reversal between increasing and decreasing of the fuel amount, the oxygen concentration downstream of the catalyst is different from the oxygen concentration when the cycle of reversal between increasing and decreasing of the fuel amount is normal, when the catalyst is deteriorated.

The output signal of the downstream oxygen concentration sensor, which is influenced by the disturbance of the cycle of reversal between increasing and decreasing of the fuel amount, repeats increase and decrease in accordance with the reversal between increasing and decreasing of the fuel amount. In the present teaching and embodiments, a set of data of the output signal of the downstream oxygen concentration sensor influenced by the disturbance of the cycle of reversal between increasing and decreasing of the fuel amount is obtained in each of unit periods of a diagnosis period, the set of data obtained in each of unit periods of a diagnosis period is not susceptible to an influence of variations including both increase and decrease, and plural sets of data are obtained during the diagnosis period. Such a set of data is obtained in each unit period that is short enough not to be greatly influenced by both increase and decrease of the repeatedly increasing and decreasing output signal of the downstream oxygen concentration sensor, and plural sets of data are obtained during the diagnosis period. Not being susceptible to an influence of variations including both increase and decrease indicates not being susceptible to an influence of variations including one increase and one decrease. Provided that the unit period is long and variations including both increases and decreases of the output signal of the downstream oxygen concentration sensor are included in one unit period, the amount of change of the output signal of the downstream oxygen concentration sensor per unit period may be zero. Data in each of such a long unit period is influenced by variations including both increase and decrease. In the present teaching and embodiments, the diagnosis period is a duration in which the rich/lean state of the output signal of the upstream oxygen concentration sensor is reversed at least twice when the cycle of reversal of the rich/lean state of the output signal of the upstream oxygen concentration sensor is normal, and the diagnosis period is a relatively long period so that one driving cycle includes plural diagnosis periods. When the cycle of reversal between increasing and decreasing of the fuel amount is disturbed, a characteristic with which the deterioration state of the catalyst can be determined appears in the output signal of the downstream oxygen concentration sensor in the diagnosis period.

The catalyst deterioration diagnosis device is configured to diagnose the deterioration state of the catalyst based on, for example, a determination value related to the deterioration of the catalyst obtained from the output signal of the downstream oxygen concentration sensor influenced by the disturbance of the cycle of reversal between increasing and decreasing of the fuel amount and a threshold value set in advance. For example, the catalyst deterioration diagnosis device diagnoses the deterioration state of the catalyst by comparing the determination value with the threshold value.

The length of the diagnosis period is arranged so that plural diagnosis periods are included in one driving cycle. The catalyst deterioration diagnosis device may diagnose the deterioration state of the catalyst based on the output signal of the downstream oxygen concentration sensor during one diagnosis period, or may diagnose the deterioration state of the catalyst based on the output signal of the downstream oxygen concentration sensor during two or more diagnosis periods.

In the present teaching and embodiments, plural types of characteristic amounts regarding a variation of the output signal of the downstream oxygen concentration sensor may include at least one of an average, a median, a mode, the maximum value, the minimum value, an accumulative value, a dispersion, or a standard deviation of an amount of change of the output signal of the downstream oxygen concentration sensor, which is obtained in each unit period of the diagnosis period.

In the present teaching and embodiments, plural types of characteristic amounts regarding a variation of the output signal of the downstream oxygen concentration sensor may include a frequency indicating how often an amount of change of the output signal of the downstream oxygen concentration sensor, which is obtained in each unit period of the diagnosis period, is at a specific value (e.g., mode).

The amount of change obtained in each unit period of the diagnosis period may be a differential value in each unit period of the diagnosis period or an amount of change per unit period in the diagnosis period.

In the present teaching and embodiments, plural types of characteristic amounts regarding a variation of the output signal of the downstream oxygen concentration sensor may include at least one of an average, a median, a mode, the maximum value, the minimum value, an accumulative value, a dispersion, or a standard deviation of a value of the output signal of the downstream oxygen concentration sensor in each unit period of the diagnosis period. In the present teaching and embodiments, plural types of characteristic amounts regarding a variation of the output signal of the downstream oxygen concentration sensor may include a difference between the maximum value in each unit period of the diagnosis period and the minimum value in each unit period of the diagnosis period. In the present teaching and embodiments, plural types of characteristic amounts regarding a variation of the output signal of the downstream oxygen concentration sensor may include a frequency indicating how often a value of the output signal of the downstream oxygen concentration sensor is at a specific value (e.g., mode) in each unit period of the diagnosis period.

In the present teaching and embodiments, plural types of characteristic amounts regarding a variation of the output signal of the downstream oxygen concentration sensor may include at least one of a skewness, a kurtosis, the number of reversals, a trajectory length, an integral value, a cycle, a frequency, or an amplitude of the output signal of the downstream oxygen concentration sensor, which are calculated from a value of the output signal of the downstream oxygen concentration sensor in each unit period of the diagnosis period.

In the present teaching and embodiments, plural types of characteristic amounts regarding a variation of the output signal of the downstream oxygen concentration sensor may include at least one of the ratio of the number of reversals, the ratio of a trajectory length, the ratio of an integral value, or the ratio of a frequency of the output signal of the downstream oxygen concentration sensor, which are calculated from a value of the output signal of the downstream oxygen concentration sensor in each unit period of the diagnosis period. The ratio of the trajectory length is, for example, the ratio of (i) a trajectory length when the output signal of the downstream oxygen concentration sensor is in a specific state to (ii) a trajectory length of the output signal of the downstream oxygen concentration sensor during the entire diagnosis period.

In the present teaching and embodiments, plural types of characteristic amounts regarding a variation of the output signal of the downstream oxygen concentration sensor may include the ratio of (i) the length of a period in which the output signal of the downstream oxygen concentration sensor is in a specific state to (ii) the length of the diagnosis period, which is calculated from a value of the output signal of the downstream oxygen concentration sensor in each unit period of the diagnosis period.

In the present teaching and embodiments, a first diagnosis condition and a second diagnosis condition may include at least one of the following conditions (A) to (I). Among the conditions (A) to (I) described below, at least one condition included in the first diagnosis condition may be identical with at least one condition included in the second diagnosis condition. Alternatively, among the conditions (A) to (I) described below, no condition included in the first diagnosis condition may be identical with any condition included in the second diagnosis condition.

A condition (A) is a condition in which the sensor element of the upstream oxygen concentration sensor is activated.

A condition (B) is a condition in which the catalyst is activated.

A condition (C) is a condition in which an amount of air sucked into the engine falls within a predetermined range.

A condition (D) is a condition in which the engine is driven so that, based on the reversal of the rich/lean state of the output signal of the upstream oxygen concentration sensor, the reversal between increasing and decreasing of the fuel amount supplied to the engine is performed.

A condition (E) is a condition in which a change of the throttle opening degree of the engine per unit time falls within a predetermined range.

A condition (F) is a condition in which the pressure inside an intake pipe through which air is supplied to the engine is equal to or lower than a predetermined pressure.

A condition (G) is a condition in which, when the engine-including device is a vehicle, the vehicle speed falls within a predetermined range.

A condition (H) is a condition in which, when the engine-including device includes a transmission, combinations of the gears of the transmission and the numbers of rotations of the engine fall within a predetermined range.

A condition (I) is a condition in which any specific process other than the diagnosis process of diagnosing the deterioration state of the catalyst is not being performed. The specific process in the condition (I) is, for example, a process which disadvantageously influences on at least one of a result of diagnosis of the deterioration state of the catalyst or an operation performed by the specific process when the diagnosis process of the deterioration state of the catalyst and the specific process are performed at the same time. The specific process may be, for example, a process for cruise control by which a speed set by the driver is automatically maintained, when the engine-including device is a vehicle.

In the present teaching and embodiments, the first diagnosis condition does not include a condition in which the cycle of reversal between increasing and decreasing of the fuel amount supplied to the engine is a cycle falling within a first range. The first diagnosis condition may include a condition different from the above-described conditions (A) to (I).

In the present teaching and embodiments, the second diagnosis condition includes a condition in which the cycle of reversal between increasing and decreasing of the fuel amount supplied to the engine is a cycle falling within a second range. The second diagnosis condition may include a condition different from the above-described conditions (A) to (I).

For example, it is possible to check whether control by the catalyst deterioration diagnosis device of the present teaching described in claim 1 is being performed, by using a measurement device such as a simulator configured to generate a pseudo signal, an external scanning tool, and either an oscilloscope or a data logger. The simulator is provided at an intermediate part of a wire to which a signal is output from the upstream oxygen concentration sensor.

Instead of the output signal of the upstream oxygen concentration sensor, a combined signal of the output signal of the upstream oxygen concentration sensor and a pseudo signal generated by the simulator is input to the catalyst deterioration diagnosis device. The external scanning tool communicates with the catalyst deterioration diagnosis device by wire or wireless. For example, when the catalyst deterioration diagnosis device is provided in the engine-including device, the external scanning tool may be detachably attached to a controller of the engine-including device, and may be able to communicate with the catalyst deterioration diagnosis device as the tool is connected to the controller of the engine-including device. The external scanning tool obtains a determination value used for the diagnosis of the deterioration state of the catalyst and information of a threshold value that is compared with the determination value in the diagnosis of the deterioration state of the catalyst, from the catalyst deterioration diagnosis device.

By generating the pseudo signal by the simulator and reversing the rich/lean state of the output signal of the upstream oxygen concentration sensor, the cycle of reversal of the rich/lean state of the output signal of the upstream oxygen concentration sensor is disturbed. As a result of this, when the increasing/decreasing tendency of the fuel amount is varied in accordance with the pseudo signal and the output signal of the downstream oxygen concentration sensor is varied in accordance with the pseudo signal, it is possible to confirm that the cycle of reversal between increasing and decreasing of the fuel amount is disturbed due to the disturbance of the cycle of reversal of the rich/lean state of the output signal of the upstream oxygen concentration sensor, and the output signal of the downstream oxygen concentration sensor is influenced by the disturbance of the cycle of reversal between increasing and decreasing of the fuel amount.

Whether the increasing/decreasing tendency of the fuel amount is varied in accordance with the pseudo signal can be determined based on a change of a timing of the increasing/decreasing tendency of the fuel amount at the time of generation of the pseudo signal. The timing of reversal between increasing and decreasing of the fuel amount can be obtained by, for example, obtaining a change over time of a correction coefficient of the fuel amount by connecting a measurement device such as an oscilloscope or a data logger with a wire of the catalyst deterioration diagnosis device. The timing of reversal of increasing/decreasing tendency of the fuel amount may be obtained based on a signal supplied from the catalyst deterioration diagnosis device to a fuel supplier configured to supply the fuel to the engine.

As described above, when it is confirmed that the output signal of the downstream oxygen concentration sensor is influenced by the disturbance of the cycle of reversal between increasing and decreasing of the fuel amount, if the magnitude relationship between the determination value and the threshold value in a case of generating the pseudo signal in the simulator while a catalyst that is not deteriorated is attached to the engine-including device is in reverse of the magnitude relationship between the determination value and the threshold value in a case of generating the pseudo signal in the simulator while a deteriorated catalyst is attached to the engine-including device, it is assumed that the control by the catalyst deterioration diagnosis device of the present teaching recited in claim 1 is being performed. In this connection, when the deterioration state of the catalyst is diagnosed based on the output signal of the downstream oxygen concentration sensor, the deterioration state of the catalyst cannot be properly diagnosed based solely on data of a single unit period of the output signal of the downstream oxygen concentration sensor. On this account, when the determination value properly indicates the deterioration state of the catalyst, it is assumed that the determination value is based on data of each of plural unit periods.

In the present teaching and embodiments, at least one of plural options encompasses all conceivable combinations of the options. At least one of plural options may be one of the options, some of the options, or all of the options. For example, at least one of A, B, or C indicates only A, only B, only C, A and B, A and C, B and C, or A, B, and C.

In the claims, when the number of constituent features is not clearly specified and the constituent feature is expressed in a singular form in English, the number of the constituent feature may be more than one in the present teaching. In the present teaching, the number of the constituent features may be only one.

In the present teaching and embodiments, terms "including", "having", "comprising", and derivatives thereof are used to encompass not only listed items and equivalents thereof but also additional items.

Unless otherwise defined, all terms (technical and scientific terms) used in this description and claims indicate meanings typically understood by a person with ordinary skill in the art in the technical field to which the present teaching belongs. Terms such as those defined in commonly used dictionaries are to be interpreted as having meaning that is consistent with their meaning in the context of the relevant art and the present disclosure, and are not to be interpreted in an idealized or excessively formal sense.

In this specification, the term "may" is non-exclusive. The term "may" indicates "may but not must". In this description, "may" implicitly encompasses "do not". In this specification, an arrangement which is explained by using the term "may" exerts at least the above-described effects of the arrangement of claim 1.

Before describing embodiments of the present teaching in detail, it is to be understood that the present teaching is not limited to the details of construction and arrangement of the components set forth in the following description or illustrated in the drawings. The present teaching is also applicable to embodiments other than the embodiments described later. The present teaching may be implemented as an embodiment other than the below-described embodiment.

Advantageous Effects

The catalyst deterioration diagnosis device of the present teaching is able to diagnose the deterioration state of a catalyst even when the cycle of reversal between increasing and decreasing tendencies of a fuel amount is disturbed due to the disturbance in the cycle of reversal of the rich/lean state of the output signal of the upstream oxygen concentration sensor.

By the catalyst deterioration diagnosis device of the present teaching, diagnosis using, for example, pattern recognition is possible because the diagnosis period is relatively long. It is therefore possible to easily diagnose the deterioration state of the catalyst.

The catalyst deterioration diagnosis device of the present teaching is able to diagnose the deterioration state of the catalyst without increasing the cycle and amplitude of the reversal between increasing and decreasing of the fuel amount so much, as compared to cases where the diagnosis is performed based on a delay time of the output signal of the downstream oxygen concentration sensor from the output signal of the upstream oxygen concentration sensor.

BRIEF DESCRIPTION OF THE DRAWINGS

FIG. 3A is a graph showing a Mahalanobis' distance when the catalyst is normal, and FIG. 3B is a histogram of the Mahalanobis' distance shown in FIG. 3A.

FIG. 4 is a partially-enlarged graph of the graph shown in FIG. 3A.

FIG. 5A is a graph showing a Mahalanobis' distance when the catalyst is deteriorated, and FIG. 5B is a histogram of the Mahalanobis' distance shown in FIG. 5A.

FIG. 6 is a partially-enlarged graph of the graph shown in FIG. 5A.

DESCRIPTION OF THE PREFERRED EMBODIMENTS

First Embodiment

Figure 1:
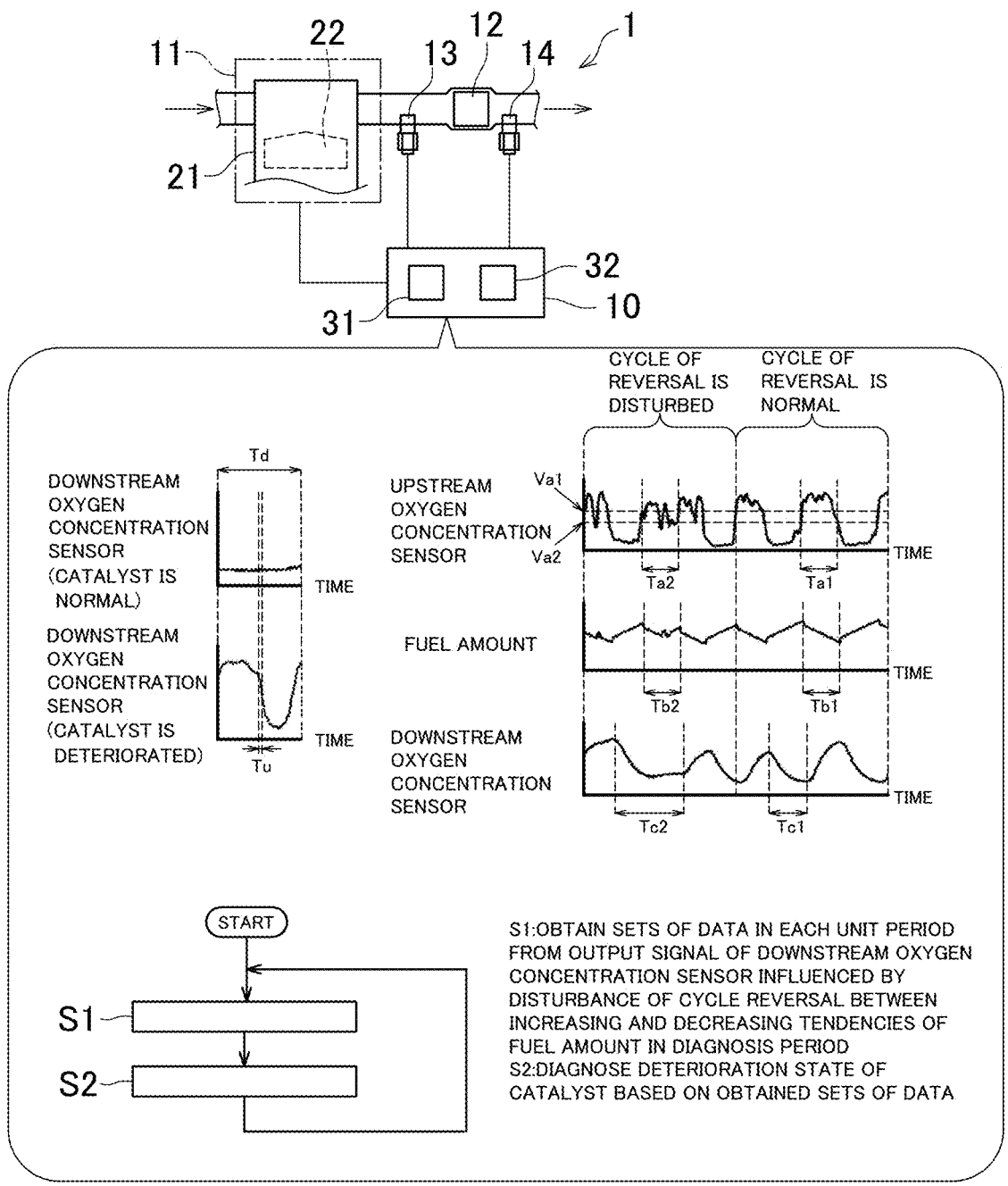
FIG. 1 illustrates a catalyst deterioration diagnosis device of the First Embodiment of the present teaching.

The following will describe a catalyst deterioration diagnosis device 10 of the First Embodiment of the present teaching with reference to FIG. 1.

As shown in FIG. 1, the catalyst deterioration diagnosis device 10 of the First Embodiment is a device provided for diagnosing the deterioration state of a catalyst 12 of an engine-including device 1 including an engine 21. While FIG. 1 shows an example in which the catalyst deterioration diagnosis device 10 is provided in the engine-including device 1, the catalyst deterioration diagnosis device 10 may not be provided in the engine-including device 1 and may be able to communicate with the engine-including device 1. The engine-including device 1 may be a vehicle or may be a device that is not a vehicle. The engine-including device 1 includes an engine unit 11, the catalyst 12, and upstream oxygen concentration sensor 13, and a downstream oxygen concentration sensor 14. The engine unit 11 includes the engine 21 and an unillustrated fuel supplier configured to supply fuel to a combustion chamber 22 of the engine 21. The engine 21 may be a 4-stroke engine or a 2-stroke engine.

The upstream oxygen concentration sensor 13 is provided upstream of the catalyst 12 in a flow direction of exhaust gas exhausted from a combustion chamber 22 of the engine 21. An output signal of the upstream oxygen concentration sensor 13 is a signal which is different in value between a case where the air-fuel ratio of an air-fuel mixture is rich and a case where the air-fuel ratio is lean, and is a signal whose value does not gradually change when the air-fuel ratio of the air-fuel mixture gradually changes. When the output signal of the upstream oxygen concentration sensor 13 is in a rich state indicating that the air-fuel ratio of the air-fuel mixture is rich, the value of the output signal of the upstream oxygen concentration sensor 13 is larger than a first value Va1, for example. When the output signal of the upstream oxygen concentration sensor 13 is in a lean state indicating that the air-fuel ratio of the air-fuel mixture is lean, the value of the output signal of the upstream oxygen concentration sensor 13 is smaller than a second value Va2, for example. The second value Va2 is equal to or smaller than the first value Va1.

The engine 21 is driven so that, based on the reversal of the rich/lean state of the output signal of the upstream oxygen concentration sensor 13, the reversal between increasing and decreasing of the fuel amount is performed. To be more specific, the fuel amount supplied from the fuel supplier to the combustion chamber 22 is controlled so that the decreasing tendency of the fuel amount is reversed to the increasing tendency, i.e., the increasing/decreasing tendency of the fuel amount is reversed, based on the switching of the output signal of the upstream oxygen concentration sensor 13 to the lean state. The fuel amount supplied from the fuel supplier to the combustion chamber 22 is controlled so that the increasing tendency of the fuel amount is reversed to the decreasing tendency, i.e., the increasing/decreasing tendency of the fuel amount is reversed, based on the switching of the output signal of the upstream oxygen concentration sensor 13 to the rich state.

The catalyst deterioration diagnosis device 10 includes a processor 31 and a storage device 32. The storage device 32 includes a non-transitory storage medium configured to store data and programs executed by the processor 31 and a transitory storage medium configured to temporarily store data. The catalyst deterioration diagnosis device 10 is configured to diagnose the deterioration state of the catalyst 12. When the catalyst deterioration diagnosis device 10 is included in the engine-including device 1, the catalyst deterioration diagnosis device 10 controls the fuel amount supplied from the fuel supplier to the combustion chamber 22 based on a process executed by the processor 31 based on a program stored in the storage device 32. When the catalyst deterioration diagnosis device 10 is included in the engine-including device 1, the catalyst deterioration diagnosis device 10 drives the engine 21 so that the reversal between increasing and decreasing of the fuel amount is performed based on the reversal of the rich/lean state of the output signal of the upstream oxygen concentration sensor 13.

The downstream oxygen concentration sensor 14 is provided downstream of the catalyst 12 in the flow direction of the exhaust gas. The output signal of the downstream oxygen concentration sensor 14 varies depending on whether the catalyst 12 is normal or deteriorated. For example, when the catalyst 12 is normal, the output signal of the downstream oxygen concentration sensor 14 scarcely changes during a diagnosis period Td, unless the driving condition of the engine 21 is changed. When the catalyst 12 is normal, unless the driving condition of the engine 21 is changed, the output signal of the downstream oxygen concentration sensor 14 is basically maintained in either a first state in which the oxygen concentration of the exhaust gas is lower than a predetermined concentration or a second state in which the oxygen concentration of the exhaust gas is higher than the predetermined concentration. However, even though the driving condition of the engine 21 is unchanged, when the catalyst 12 is normal, the output signal of the downstream oxygen concentration sensor 14 may he changed from a state of being maintained in the first state to a state of being maintained in the second state, or from a state of being maintained in the second state to a state of being maintained in the first state. When the catalyst 12 is normal and the output signal of the downstream oxygen concentration sensor 14 is maintained in the first state or the second state, the value of the output signal of the downstream oxygen concentration sensor 14 may slightly increase and decrease. On the other hand, when the catalyst 12 is deteriorated, even though the driving condition of the engine 21 is unchanged, the number of times of switching of the output signal of the downstream oxygen concentration sensor 14 between the first state and the second state during the diagnosis period Td is large as compared to cases where the catalyst 12 is normal. When the catalyst 12 is deteriorated, the larger the number of reversals of the rich/lean state of the output signal of the upstream oxygen concentration sensor 13 during the diagnosis period Td is, the larger the number of times of switching of the output signal of the downstream oxygen concentration sensor 14 between the first state and the second state during the diagnosis period Td tends to be.

The diagnosis period Td is a duration in which the rich/lean state of the output signal of the upstream oxygen concentration sensor 13 is reversed at least twice when the cycle of reversal of the rich/lean state of the output signal of the upstream oxygen concentration sensor 13 is normal, and the diagnosis period Td has a length with which one driving cycle includes plural diagnosis periods. For example, assume that the diagnosis period Td is a duration in which the rich/lean state of the output signal of the upstream oxygen concentration sensor 13 is reversed only once when the cycle of reversal of the rich/lean state of the output signal of the upstream oxygen concentration sensor 13 is normal. In this case, when the output signal of the downstream oxygen concentration sensor 14 is reversed only once from the first state to the second state or from the second state to the first state during the diagnosis period Td, it is difficult to determine whether the catalyst 12 is deteriorated. Because the diagnosis period Td is a duration in which the rich/lean state of the output signal of the upstream oxygen concentration sensor 13 is reversed at least twice when the cycle of reversal of the rich/lean state of the output signal of the upstream oxygen concentration sensor 13 is normal, a characteristic with which the deterioration state of the catalyst 12 can be determined appears in the output signal of the downstream oxygen concentration sensor during the diagnosis period Td. The length of the diagnosis period Td may be set regardless of the length of the cycle of reversal between increasing and decreasing of the fuel amount, or may be set in accordance with the length of the cycle of reversal between increasing and decreasing of the fuel amount. For example, the diagnosis period Td may be a period of about 1 second. Alternatively, for example, the diagnosis period Td may be a period that is more or less equivalent to four cycles of reversal between increasing and decreasing of the fuel amount.

The following will describe the disturbance of the cycle of reversal of the rich/lean state of the output signal of the upstream oxygen concentration sensor 13, the disturbance of the cycle of reversal between increasing and decreasing of the fuel amount, and the output signal of the downstream oxygen concentration sensor 14 influenced by the disturbance of the cycle of reversal between increasing and decreasing of the fuel amount.

FIG. 1 shows an example of the relationship between changes in the output signal of the upstream oxygen concentration sensor 13, changes in the fuel amount, and changes in the output signal of the downstream oxygen concentration sensor 14 in a given period.

In the example shown in FIG. 1, the cycle of reversal of the rich/lean state of the output signal of the upstream oxygen concentration sensor 13 is disturbed in the first half of the period, whereas the cycle of reversal of the rich/lean state of the output signal of the upstream oxygen concentration sensor 13 is normal in the second half of the period. In the example shown in FIG. 1, a period Ta1 is a duration in which the rich/lean state of the output signal of the upstream oxygen concentration sensor 13 is reversed twice when the cycle of reversal of the rich/lean state of the output signal of the upstream oxygen concentration sensor 13 is normal. On the other hand, in the example shown in FIG. 1, when the cycle of reversal of the rich/lean state of the output signal of the upstream oxygen concentration sensor 13 is disturbed, the rich/lean state of the output signal of the upstream oxygen concentration sensor 13 is reversed at least three times during a period Ta2 that is identical in length with the period Ta1.

When the cycle of reversal of the rich/lean state of the output signal of the upstream oxygen concentration sensor 13 is normal, the cycle of reversal between increasing and decreasing of the fuel amount is normal. In the example shown in FIG. 1, the period Tb1 is a duration in which the increasing/decreasing tendency of the fuel amount is reversed twice when the cycle of reversal between increasing and decreasing of the fuel amount is normal. As the cycle of reversal of the rich/lean state of the output signal of the upstream oxygen concentration sensor 13 is disturbed, the cycle of reversal between increasing and decreasing of the fuel amount is disturbed. In the example shown in FIG. 1, when the cycle of reversal of the rich/lean state of the output signal of the upstream oxygen concentration sensor 13 is disturbed, the increasing/decreasing tendency of the fuel amount is reversed at least three times during a period Tb2 that is identical in length with the period Tb1. In the example shown in FIG. 1, changes of the fuel amount are indicated by changes of a correction coefficient of the fuel amount.

When the cycle of reversal between increasing and decreasing of the fuel amount is disturbed, the output signal of the downstream oxygen concentration sensor 14 is influenced by the disturbance of the cycle of reversal between increasing and decreasing of the fuel amount. For example, in the example shown in FIG. 1, a period Tc1 is a duration in which the cycle of reversal between increasing and decreasing of the fuel amount is normal and the value of the output signal of the downstream oxygen concentration sensor 14 starts to decrease and then starts to increase. In this regard, in the example shown in FIG. 1, when the catalyst 12 is deteriorated, a period Tc2 in which the cycle of reversal between increasing and decreasing of the fuel amount is disturbed and the value of the output signal of the downstream oxygen concentration sensor 14 starts to decrease and then starts to increase is longer than the period Tc1 described above. However, the influence of the disturbance in the cycle of reversal between increasing and decreasing of the fuel amount on the output signal of the downstream oxygen concentration sensor 14 is not limited to the influence described in the example shown in FIG. 1.

In the First Embodiment, the flow of a process of diagnosing the deterioration state of the catalyst 12 by the catalyst deterioration diagnosis device 10 will be described. In the First Embodiment, the deterioration state of the catalyst 12 is diagnosed in such a way that the processor 31 of the catalyst deterioration diagnosis device 10 performs a diagnosis process in accordance with the flowchart shown in FIG. 1 based on a program stored in the storage device 32. In the First Embodiment, after the first diagnosis condition not including a condition in which the cycle of reversal between increasing and decreasing of the fuel amount is a cycle within the first range is satisfied, the catalyst deterioration diagnosis device 10 may perform first diagnosis of performing the diagnosis process after the processor 31 sets the cycle of reversal between increasing and decreasing of the fuel amount to fall within the first range by performing diagnosis reversal control of controlling the cycle of reversal between increasing and decreasing of the fuel amount to be a cycle falling within the first range.

Alternatively, in the First Embodiment, the catalyst deterioration diagnosis device 10 may perform a second diagnosis in which the processor 31 performs the diagnosis process after the second diagnosis condition including a condition in which the cycle of reversal between increasing and decreasing of the fuel amount is a cycle that is shorter than the cycles falling within the first range and falls within a second range is satisfied in a state in which the 31 is not performing the diagnosis reversal processor control.

The catalyst deterioration diagnosis device 10 may perform the first diagnosis and not perform the second diagnosis.

Alternatively, the catalyst deterioration diagnosis device 10 may not perform the first diagnosis and may perform the second diagnosis.

Alternatively, the catalyst deterioration diagnosis device 10 may perform the first diagnosis and may perform the second diagnosis at a timing at which the first diagnosis is not performed.

When the catalyst deterioration diagnosis device 10 performs the first diagnosis and performs the second diagnosis at a timing when the first diagnosis is not performed, the catalyst deterioration diagnosis device 10 may perform the second diagnosis when a third diagnosis condition is not satisfied, and may perform the first diagnosis when the third diagnosis condition is satisfied. The third diagnosis condition may include a condition in which the diagnosis process has not been performed at least for a predetermined period, for example. The third diagnosis condition may include a condition in which the current situation is not a situation in which the engine-including device 1 is a vehicle and decrease in drivability is likely to be a problem, for example.

The situation in which decrease in drivability is likely to be a problem may be a situation in which the engine-including device 1 is a vehicle and cruise control is being performed, for example. In this situation, if the air-fuel ratio is significantly changed in the diagnosis reversal control, the vehicle speed maintained by the cruise control is changed and the drivability tends to be decreased.

The situation in which decrease in drivability is likely to be a problem may be, for example, a situation in which, when the engine-including device 1 is a vehicle with a multistage transmission, the gear stage of the multistage transmission is lower than a predetermined gear stage while the vehicle speed of the vehicle is at a predetermined vehicle speed. In this situation, the vehicle speed is significantly changed due to a change in the air-fuel ratio by the diagnosis reversal control as compared to a situation in which the gear stage of the multistage transmission is equal to or higher the predetermined gear stage, with the result that decrease in drivability tends to occur.

Furthermore, the situation in which decrease in drivability is likely to be a problem may be, for example, a situation in which, when the engine-including device 1 is a vehicle with a multistage transmission, the gear stage of the multistage transmission is higher than the predetermined gear stage while the vehicle speed of the vehicle is at the predetermined vehicle speed. In this situation, as compared to a situation in which the gear stage of the multistage transmission is equal to or higher than the predetermined gear stage, the rider tends to feel uneasy with a change of sound due to a change of the air-fuel ratio by the diagnosis reversal control when the rotation speed of the engine is low, with the result that decrease in drivability tends to occur.

Furthermore, the situation in which decrease in drivability is likely to be a problem may be, for example, a situation in which the engine-including device 1 is a vehicle and vibrations causing a suspension and/or the undercarriage supporting a wheel to resonate are generated in the vehicle. In this case, when the air-fuel ratio is significantly changed by the diagnosis reversal control, resonation of the suspension and/or the undercarriage of the vehicle tends to change the posture of the vehicle, and decrease in drivability tends to be a problem.

When the catalyst deterioration diagnosis device 10 performs the first diagnosis and performs the second diagnosis at a timing when the first diagnosis is not performed, the catalyst deterioration diagnosis device 10 may diagnose the deterioration state of the catalyst based on a result of the first diagnosis and a result of the second diagnosis.

The flowchart shown in FIG. 1 will be detailed. In the step S1, the processor 31 obtains sets of data in each unit period Tu from the output signal of the downstream oxygen concentration sensor 14 influenced by the disturbance of the cycle of reversal between increasing and decreasing of the fuel amount in the diagnosis period Td. The unit period Tu is a period that is short enough so that a change of the output signal of the downstream oxygen concentration sensor 14 is not susceptible to an influence of variations including both increase and decrease of the fuel amount. The unit period Tu may be a duration of about 10 to 30 ms, for example.

Subsequently, in the step S2, the processor 31 diagnoses the deterioration state of the catalyst 12 based on the plural sets of data of the output signal of the downstream oxygen concentration sensor 14 obtained in the step S1. In this connection, for example, a determination value used for diagnosing the deterioration state of the catalyst 12 may be calculated from the plural sets of data obtained in the step S1, and the deterioration state of the catalyst may be diagnosed based on the magnitude relationship between the determination value and a threshold value stored in the storage device 32 in advance.

Alternatively, the deterioration state of the catalyst 12 may be diagnosed based on plural sets of obtained data, for each of plural diagnosis periods Td. When diagnosis results in a predetermined number or more of the diagnosis periods Td indicate that the catalyst 12 is deteriorated, it may be diagnosed that the catalyst 12 is deteriorated. After the step S2, the process goes back to the step S1.

If, being different from the First Embodiment, diagnosis is performed based on a delay time of the output signal of the downstream oxygen concentration sensor 14 from the output signal of the upstream oxygen concentration sensor 13 as described in, e.g., Patent Literature 1, the deterioration state of the catalyst 12 may not be successfully diagnosed when the cycle of reversal between increasing and decreasing of the fuel amount is disturbed due to the disturbance in the cycle of reversal of the rich/lean state of the output signal of the upstream oxygen concentration sensor 13.

In this regard, the catalyst deterioration diagnosis device 10 of the First Embodiment diagnoses the deterioration state of the catalyst 12 based on plural sets of data in each unit period Tu of the output signal of the downstream oxygen concentration sensor 14 during the diagnosis period Td. On this account, even though the cycle of reversal between increasing and decreasing of the fuel amount is disturbed as the cycle of reversal of the rich/lean state of the output signal of the upstream oxygen concentration sensor 13 is disturbed, it is possible to diagnose the deterioration state of the catalyst 12.

In the catalyst deterioration diagnosis device 10 of the First Embodiment, because the diagnosis period Td is relatively long, a characteristic by which the deterioration state of the catalyst 12 can be determined appears in the output signal of the downstream oxygen concentration sensor 14 during the diagnosis period. On this account, for example, diagnosis utilizing pattern recognition such as Mahalanobis- Taguchi Method (MT Method) can be performed. It is therefore possible to easily diagnose the deterioration state of the catalyst 12.

When the deterioration state of the catalyst 12 is diagnosed by utilizing pattern recognition, the process of diagnosing the deterioration state of the catalyst 12 is simplified as compared to a case where diagnosis is performed based on a delay time of the output signal of the downstream oxygen concentration sensor 14 from the output signal of the upstream oxygen concentration sensor 13. This makes it possible to reduce the development man-hour of the catalyst deterioration diagnosis device 10. Furthermore, the computing load of the processor 31 is reduced and the degree of freedom in designing the hardware resource is improved. Furthermore, when the deterioration state of the catalyst 12 is diagnosed by utilizing pattern recognition, the time required for diagnosing the deterioration state of the catalyst 12 is shortened as compared to a case where diagnosis is performed based on a delay time of the output signal of the downstream oxygen concentration sensor 14 from the output signal of the upstream oxygen concentration sensor 13. This makes it possible to diagnose the deterioration state of the catalyst 12 in real time.

When, being different from the First Embodiment, the diagnosis is performed based on a delay time of the output signal of the downstream oxygen concentration sensor 14 from the output signal of the upstream oxygen concentration sensor 13, the cycle and amplitude of reversal between increasing and decreasing of the fuel amount need to be long and large.

In this regard, the catalyst deterioration diagnosis device 10 of the First Embodiment diagnoses the deterioration state of the catalyst 12 based on plural sets of data in each unit period Tu of the output signal of the downstream oxygen concentration sensor 14 during the diagnosis period Td. On this account, it is possible to diagnose the deterioration state of the catalyst 12 without increasing the cycle and amplitude of the reversal between increasing and decreasing of the fuel amount so much, as compared to cases where the diagnosis is performed based on a delay time of the output signal of the downstream oxygen concentration sensor 14 from the output signal s of the upstream oxygen concentration sensor 13.

When the cycle and amplitude of reversal between increasing and decreasing of the fuel amount are increased, the catalyst 12 needs to be large enough to be able to purify the exhaust gas after the increase of the cycle and amplitude of reversal between increasing and decreasing of the fuel amount. In this regard, according to the First Embodiment, it is possible to diagnose the deterioration state of the catalyst 12 without increasing the cycle and amplitude of reversal between increasing and decreasing of the fuel amount. This makes it possible to suppress the upsizing of the catalyst 12.

The purification performance of purifying the exhaust gas by the catalyst 12 is high when a difference between the air-fuel ratio and the stoichiometric air-fuel ratio is small. However, when the cycle and amplitude of reversal between increasing and decreasing of the fuel amount are increased, the difference between the air-fuel ratio and the stoichiometric air-fuel ratio may become large. In this regard, according to the First Embodiment, it is possible to diagnose the deterioration state of the catalyst 12 without increasing the cycle and amplitude of reversal between increasing and decreasing of the fuel amount. It is therefore possible to suppress the decrease in purification performance of purifying the exhaust gas by the catalyst 12 by decreasing the difference between the air-fuel ratio and the stoichiometric air-fuel ratio.

In the First Embodiment, because the cycle and amplitude of reversal between increasing and decreasing of the fuel amount do not need to be long and large as compared to a case where the diagnosis is performed based on a delay time of the output signal of the downstream oxygen concentration sensor 14 from the output signal of the upstream oxygen concentration sensor 13, the decrease in drivability can be suppressed when the engine-including device 1 is a vehicle.

In the First Embodiment, because the cycle and amplitude of reversal between increasing and decreasing of the fuel amount do not need to be long and large for diagnosing the deterioration state of the catalyst 12 as compared to a case where the diagnosis is performed based on a delay time of the output signal of the downstream oxygen concentration sensor 14 from the output signal of the upstream oxygen concentration sensor 13, opportunities for diagnosing the deterioration state of the catalyst 12 can be easily obtained.

When the deterioration state of the catalyst 12 is diagnosed based on a delay time of the output signal of the downstream oxygen concentration sensor 14 from the output signal of the upstream oxygen concentration sensor 13, the driving range of the engine 21 with which the diagnosis is possible is restricted. In this regard, in the First Embodiment, the deterioration state of the catalyst 12 is diagnosed based on plural sets of data in each unit period, which are obtained during the diagnosis period Td and are not susceptible to variations including both increase and decrease of the output signal of the downstream oxygen concentration sensor 14 during the relatively long diagnosis period Td. On this account, the driving range of the engine 21 with which the diagnosis is possible is widened as compared to a case where the diagnosis is performed based on a delay time of the output signal of the downstream oxygen concentration sensor 14 from the output signal of the upstream oxygen concentration sensor 13. It is therefore possible to increase the opportunities of diagnosing the deterioration state of the catalyst 12. For example, the range of the engine rotation speed with which the diagnosis is possible may be widened to cover a high-speed range. As the driving range of the engine 21 with which the diagnosis is possible is widened, the vehicle speed range with which the diagnosis is possible is widened when the engine-including device 1 is a vehicle. Furthermore, for example, the range of the engine rotation speed with which the diagnosis is possible may be widened to cover a low-speed range. This may make it possible, for example, to diagnose the deterioration state of the catalyst 12 in a lower half of the range of the engine rotation speed, when the range is divided in half. The arrangement above may further make it possible, for example, to diagnose the deterioration state of the catalyst 12 in the lowest one among three ranges of the engine rotation speed, when the range of the engine rotation speed is equally divided into three ranges. For example, when the engine rotation speed is at an idling rotation speed, it may be possible to diagnose the deterioration state of the catalyst 12.

When, being different from the First Embodiment, the deterioration state of the catalyst 12 is diagnosed based on a delay time of the output signal of the downstream oxygen concentration sensor 14 from the output signal of the upstream oxygen concentration sensor 13, the oxygen introduction amount and the oxygen discharge amount to and from the catalyst 12 need to be constant or almost constant. In this regard, it is difficult to arrange the oxygen introduction amount and the oxygen discharge amount to and from the catalyst 12 to be constant or almost constant when the engine rotation speed is at the idling rotation speed. When, being different from the First Embodiment, the deterioration state of the catalyst 12 is diagnosed based on a delay time of the output signal of the downstream oxygen concentration sensor 14 from the output signal of the upstream oxygen concentration sensor 13, the cycle and amplitude of reversal between increasing and decreasing of the fuel amount must be increased. If the cycle and amplitude of reversal between increasing and decreasing of the fuel amount are controlled to be increased when the engine rotation speed is at the idling rotation speed, the rotation speed of the engine significantly changes and the rider tends to feel uneasy. For this reason, when, being different from the First Embodiment, the deterioration state of the catalyst 12 is diagnosed based on a delay time of the output signal of the downstream oxygen concentration sensor 14 from the output signal of the upstream oxygen concentration sensor 13, it is difficult to diagnose the deterioration state of the catalyst 12 when the engine rotation speed is at the idling rotation speed.

In the catalyst deterioration diagnosis device 10, while the diagnosis reversal control is performed when the first diagnosis is performed, the diagnosis reversal control is not performed when the second diagnosis is performed. Due to this, when the first diagnosis is performed in the catalyst deterioration diagnosis device 10, variations in reversal between increasing and decreasing of the fuel amount are small as compared to cases where the second diagnosis is performed. On this account, when the first diagnosis is performed in the catalyst deterioration diagnosis device 10, the time required for the diagnosis is short as compared to cases where the second diagnosis is performed.

Due to an influence of, for example, blowby gas, canister purge, and differences in air-fuel ratio between cylinders when the engine 21 is a multi-cylinder engine, a deviation may occur between whether the output signal of the upstream oxygen concentration sensor 13 is in the rich state or the lean state and whether the air-fuel ratio of the air-fuel mixture is actually rich or lean, with the result that a timing of reversal between increasing and decreasing of the fuel amount may be varied due to the deviation. In this case, variations of the output signal of the downstream oxygen concentration sensor 14 become significant. In this regard, in the catalyst deterioration diagnosis device 10, while the diagnosis reversal control is performed when the first diagnosis is performed, the diagnosis reversal control is not performed when the second diagnosis is performed. Due to this, when the first diagnosis is performed in the catalyst deterioration diagnosis device 10, variations in the signal of the downstream oxygen concentration sensor 14 are suppressed as compared to cases where the second diagnosis is performed. On this account, when the first diagnosis is performed in the catalyst deterioration diagnosis device 10, the time required for the diagnosis is short as compared to cases where the second diagnosis is performed, while the accuracy of the diagnosis is maintained.

In addition to the above, because the diagnosis reversal control is not performed when the catalyst deterioration diagnosis device 10 performs the second diagnosis and does not perform the first diagnosis, the cycle and amplitude of reversal between increasing and decreasing of the fuel amount are small as compared to cases where the first diagnosis for which the diagnosis reversal control is performed is performed. Due to this, the following effects are obtained.

When the catalyst deterioration diagnosis device 10 performs the second diagnosis and does not perform the first diagnosis, upsizing of the catalyst 12 is suppressed as compared to cases where the first diagnosis is performed.

When the catalyst deterioration diagnosis device 10 performs the second diagnosis and does not perform the first diagnosis, a difference between the actual air-fuel ratio and the stoichiometric air-fuel ratio is reduced and decrease in purification performance of purifying the exhaust gas by the catalyst 12 is suppressed, as compared to cases where the first diagnosis is performed.

When the engine-including device 1 is a vehicle and the catalyst deterioration diagnosis device 10 performs the second diagnosis and does not perform the first diagnosis, decrease in drivability is suppressed as compared to cases where the first diagnosis is performed.

When the catalyst deterioration diagnosis device 10 performs the second diagnosis and does not perform the first diagnosis, opportunities for diagnosing the deterioration state of the catalyst 12 are easily obtained as compared to cases where the first diagnosis is performed.

In the catalyst deterioration diagnosis device 10, while the diagnosis reversal control is performed when the first diagnosis is performed, the diagnosis reversal control is not performed when the second diagnosis is performed. On this account, when the second diagnosis is performed in the catalyst deterioration diagnosis device 10, the computing load of the processor 31 is reduced and the degree of freedom in designing the hardware resource is improved, as compared to cases where the first diagnosis is performed.

When the catalyst deterioration diagnosis device 10 performs the first diagnosis, a setting value for the diagnosis of the deterioration state of the catalyst 12 must be set based on data collected by performing a test of the diagnosis reversal control. On the other hand, when the catalyst deterioration diagnosis device 10 performs the second diagnosis and does not perform the first diagnosis, the diagnosis reversal control is not performed when the deterioration state of the catalyst 12 is diagnosed. On this account, it is possible to set a setting value for the diagnosis of the deterioration state of the catalyst 12 based on data which is collected by another test that is, for example, a test of whether the purification performance of purifying the exhaust gas satisfies a predetermined condition. It is therefore unnecessary to collect data by performing a test of the diagnosis reversal control, and hence the development man-hour is decreased as compared to cases where the catalyst deterioration diagnosis device 10 performs the first diagnosis.

Second Embodiment

Figure 2:
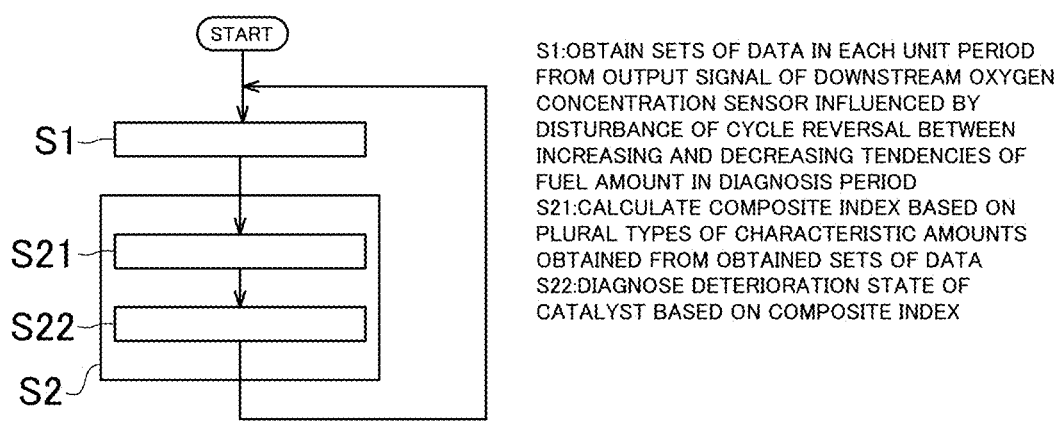
FIG. 2 is a flowchart showing the flow of a process of diagnosing the deterioration state of a catalyst by a catalyst deterioration diagnosis device of the Second Embodiment of the present teaching.

The following will describe a catalyst deterioration diagnosis device 10 of the Second Embodiment of the present teaching with reference to FIG. 2. The catalyst deterioration diagnosis device 10 of the Second Embodiment has the same structure s the catalyst deterioration diagnosis device 10 of the First Embodiment. In the Second Embodiment, the deterioration state of the catalyst 12 is diagnosed in such a way that the processor 31 of the catalyst deterioration diagnosis device 10 performs a process in accordance with the flowchart shown in FIG. 2 based on a program stored in the storage device 32.

The flowchart shown in FIG. 2 will be detailed. In the step S1, in the same manner as in the First Embodiment, the processor 31 obtains sets of data in each unit period Tu from the output signal of the downstream oxygen concentration sensor 14 influenced by the disturbance of the cycle of reversal between increasing and decreasing of the fuel amount in the diagnosis period Td.

Then the processor 31 executes processes of the steps S21 and S22 in the step S2. In the step S21, the processor 31 calculates a composite index of plural types of characteristic amounts as a single determination value to which the plural types of the characteristic amounts are reflected, based on the plural types of the characteristic amounts regarding a variation of the output signal of the downstream oxygen concentration sensor 14, which are obtained from plural sets of data obtained in the step S1.

The plural types of the characteristic amounts regarding a variation of the output signal of the downstream oxygen concentration sensor 14 may include an average of the amount of change of the output signal of the downstream oxygen concentration sensor 14, which is obtained in each unit period Tu during the diagnosis period Td. The plural types of the characteristic amounts regarding a variation of the output signal of the downstream oxygen concentration sensor 14 may include the maximum value of the amount of change of the output signal of the downstream oxygen concentration sensor 14, which is obtained in each unit period Tu during the diagnosis period Td.

The composite index of the plural types of the characteristic amounts may be, for example, a value related to the Mahalanobis' distance used in the MT method. The Mahalanobis' distance indicates the distance from a reference data group. The closer the Mahalanobis' distance is to 1, the closer the data based on which the Mahalanobis' distance is obtained is to the reference data group. The value related to the Mahalanobis' distance may be a value obtained by squaring the Mahalanobis' distance, for example. In the field of quality engineering in which the Mahalanobis' distance is used, the value obtained by squaring the Mahalanobis' distance may be termed a Mahalanobis' distance. The reference data group may include a data group of the output signal of the downstream oxygen concentration sensor 14 when the catalyst 12 is normal, and may include a data group of the output signal of the downstream oxygen concentration sensor 14 when the catalyst 12 is deteriorated. The storage device of the catalyst deterioration diagnosis device 10 may store a data group of the output signal of the downstream oxygen concentration sensor 14 in various driving ranges of the engine 21, as a reference data group. For example, a data group of the output signal of the downstream oxygen concentration sensor 14 when the engine rotation speed is different may be stored as a reference data group.

In the step S22, the processor 31 diagnoses the deterioration state of the catalyst based on the value of the composite index calculated in the step S21. For example, the composite index calculated in the step S21 is a value related to the Mahalanobis' distance and the reference data group includes a data group of the output signal of the downstream oxygen concentration sensor 14 when the catalyst 12 is normal. In this case, in the step S22, it is determined that the catalyst 12 is normal when the value related to the Mahalanobis' distance is less than a threshold and it is determined that the catalyst 12 is deteriorated when the value related to the Mahalanobis' distance is equal to or more than the threshold. For example, assume that the composite index calculated in the step S21 is a value related to the Mahalanobis' distance and the reference data group includes a data group of the output signal of the downstream oxygen concentration sensor 14 when the catalyst 12 is deteriorated. In this case, in the step S22, it is determined that the catalyst 12 is deteriorated when the value related to the Mahalanobis' distance is less than a threshold and it is determined that the catalyst 12 is normal when the value related to the Mahalanobis' distance is equal to or more than the threshold.

In the Second Embodiment, the value of the composite index other than the value related to the Mahalanobis' distance may be calculated as the composite index of the plural types of the characteristic amounts in the step S21, and the deterioration state of the catalyst may be diagnosed based on the value of the composite index other than the value related to the Mahalanobis' distance in the step S22.

In the Second Embodiment, a single determination value other than the composite index of the plural types of the characteristic amounts may be calculated as a single determination value to which the plural types of the characteristic amounts are reflected in the step S21, and the deterioration state of the catalyst may be diagnosed based on the determination value other than the composite index in the step S22.

The catalyst deterioration diagnosis device 10 of the Second Embodiment is able to easily and precisely perform a process for diagnosing the deterioration state of the catalyst 12, by diagnosing the deterioration state of the catalyst 12 based on the value of the composite index.

The catalyst deterioration diagnosis device 10 of the Second Embodiment can easily execute a process of diagnosing the deterioration state of the catalyst 12. This makes it possible to reduce the development man-hour of the catalyst deterioration diagnosis device 10. Furthermore, the computing load of the processor 31 is reduced and the degree of freedom in designing the hardware resource is improved.

In the catalyst deterioration diagnosis device 10 of the Second Embodiment, the state of deterioration of the catalyst 12 is diagnosed based on the value of the composite index. On this account, the time required for diagnosing the deterioration state of the catalyst 12 is shortened as compared to a case where diagnosis is performed based on a delay time of the output signal of the downstream oxygen concentration sensor 14 from the output signal of the upstream oxygen concentration sensor 13. This makes it possible to diagnose the deterioration state of the catalyst 12 in real time.

The catalyst deterioration diagnosis device 10 may be arranged to be able to perform both (i) a process for diagnosing the deterioration state of the catalyst 12 based on the output signal of the downstream oxygen concentration sensor 14 when the cycle of reversal between increasing and decreasing of the fuel amount is disturbed due to the disturbance of the cycle of reversal of rich/lean of the output signal of the upstream oxygen concentration sensor 13 as described in the First Embodiment and the Second Embodiment and (ii) for diagnosing a process the deterioration state of the catalyst 12 while suppressing the disturbance of the cycle of reversal between increasing and decreasing of the fuel amount due to the disturbance of the cycle of reversal of rich/lean of the output signal of the upstream oxygen concentration sensor 13 as described in, for example, Patent Literature 1.

In the First Embodiment and the Second Embodiment, the deterioration state of the catalyst 12 may be diagnosed based on both the output signal of the upstream oxygen concentration sensor 13 and the output signal of the downstream oxygen concentration sensor 14.

Specific Example of the Second Embodiment

The following will describe a catalyst deterioration diagnosis device 10 of a specific example of the Second Embodiment of the present teaching with reference to FIG. 3A, FIG. 3B, FIG. 4, FIG. 5A, FIG. 5B, and FIG. 6. It is noted that specific examples of the Second Embodiment are not limited to the specific example described below. In the step S21 described in the Second Embodiment, a processor 31 of the specific example calculates a value related to the Mahalanobis' distance as a single determination value to which the plural types of the characteristic amounts regarding a variation of the output signal of the downstream oxygen concentration sensor 14 are reflected. In the specific example, the plural types of the characteristic amounts regarding a variation of the output signal of the downstream oxygen concentration sensor 14 include at least an average, the maximum value, and a standard deviation of an amount of change obtained in each unit period Tu during the diagnosis period Td. In the specific example, the length of the diagnosis period Td is constant regardless of the length of the cycle of reversal between increasing and decreasing of the fuel amount. In the specific example, a storage device 32 of the catalyst deterioration diagnosis device 10 stores a data group of the output signals of the downstream oxygen concentration sensor 14 and the upstream oxygen concentration sensor 13 when the catalyst 12 is normal, as a reference data group for the Mahalanobis' distance. In the specific example, the engine-including device 1 is a vehicle having a multistage transmission (to be more specific, 6-speed transmission).

FIG. 3A and FIG. 5A include graphs of an engine rotation speed ES, a vehicle speed VS, a throttle opening degree TP, a gear position (gear stage) GP of the multistage transmission, the output signal of the upstream oxygen concentration sensor 13, and the output signal of the downstream oxygen concentration sensor 14 in one driving cycle. The horizontal axis in each of FIG. 3A and FIG. 5A indicates time. The throttle opening degree TP is an opening degree of a throttle valve by which an amount of air supplied to an engine 21 is adjusted. Changes of the engine rotation speed ES, the vehicle speed VS, the throttle opening degree TP, the gear position GP, and the output signal of the upstream oxygen concentration sensor 13 are more or less identical between FIG. 3A and FIG. 5A. The lowest graph in each of FIG. 3A and FIG. 5A shows the Mahalanobis' distance calculated in each period that is identical in length with the diagnosis period Td, over the entirety of one driving cycle. It is noted that the catalyst deterioration diagnosis device 10 of the specific example is not required to calculate a value related to the Mahalanobis' distance over the entirety of one driving cycle. The catalyst deterioration diagnosis device 10 of the specific example diagnoses the deterioration state of the catalyst 12 by calculating a value related to the Mahalanobis' distance of at least one diagnosis period Td in one driving cycle. In a strict sense, the vertical axis of the lowest graph in each of FIG. 3A and FIG. 5A indicates a value obtained by squaring the Mahalanobis' distance. Hereinafter, the value obtained by squaring the Mahalanobis' distance is termed a Mahalanobis' distance. The maximum value on the vertical axis of the lowest graph in each of FIG. 3A and FIG. 5A is 180.

FIG. 3A is a graph when the catalyst 12 is normal. FIG. 3B is a histogram of the Mahalanobis' distance shown in FIG. 3A. The horizontal axis of FIG. 3B indicates sections of Mahalanobis' distances, whereas the vertical axis indicates the number of Mahalanobis' distances included in each section. As shown in FIG. 3B, most of the Mahalanobis' distances in one driving cycle shown in FIG. 3A are values close to 1. FIG. 4 shows graphs in which four parts of the graphs in FIG. 3A are enlarged. It is noted that the maximum value on the vertical axis showing the Mahalanobis' distance in FIG. 4 is 20. The lengths t1 of time in the respective four graphs in FIG. 4 are identical with each other, and each length t1 is plural times as long as the diagnosis period Td.

Among the four graphs in FIG. 4, the leftmost graph indicates constant driving in which the driving condition of the engine 21 scarcely changes. The output signal of the downstream oxygen concentration sensor 14 scarcely changes and the Mahalanobis' distance is maintained almost at 1. The second graph from the left end indicates a case where the gear position GP is changed. When the gear position GP is changed, the throttle opening degree TP is temporarily decreased significantly, and the engine rotation speed ES is temporarily decreased after being gradually increased. When the gear position GP is changed, the output signal of the downstream oxygen concentration sensor 14 is varied and the Mahalanobis' distance is significantly larger than 1. The third graph from the left end indicates a case where the throttle valve is closed and the vehicle decelerates. When the throttle valve is closed, the output signal of the downstream oxygen concentration sensor 14 is varied and the Mahalanobis' distance is significantly larger than 1. In the fourth graph from the left end, constant driving in which the driving condition of the engine 21 scarcely changes is performed, but the Mahalanobis' distance is significantly larger than 1 because the output signal of the downstream oxygen concentration sensor 14 does not change at all. The pattern shown in the fourth graph from the left end seldom occurs. However, in order to accurately diagnose the deterioration state of the catalyst 12 even if such a pattern occurs, the catalyst deterioration diagnosis device 10 may diagnose the deterioration state of the catalyst 12 by utilizing a value related to the Mahalanobis' distances in plural diagnosis periods Td. In other words, as described in the First Embodiment, when diagnosis results in a predetermined number or more of the diagnosis periods Td indicate that the catalyst 12 is deteriorated, the catalyst deterioration diagnosis device 10 may diagnose that the catalyst 12 is deteriorated. Meanwhile, when the driving condition of the engine 21 is significantly varied even though the catalyst 12 is normal as shown in the second and third graphs from the left end, the output signal of the downstream oxygen concentration sensor 14 is significantly varied and the Mahalanobis' distance becomes a lot larger than 1. On this account, the catalyst deterioration diagnosis device 10 may perform the diagnosis only when the driving condition of the engine 21 does not significantly change.

FIG. 5A is a graph when the catalyst 12 is deteriorated. FIG. 5B is a histogram of the Mahalanobis' distance shown in FIG. 5A. As shown in FIG. 5B, most of the Mahalanobis' distances in one driving cycle shown in FIG. 5A are values equal to or more than 10. FIG. 6 shows graphs in which four parts of the graphs in FIG. 5A are enlarged. It is noted that the maximum value on the vertical axis showing the Mahalanobis' distance in FIG. 6 is 180. The lengths t2 of time in the respective four graphs in FIG. 6 are identical with each other. Each length t2 is several times as long as the diagnosis period Td and is longer than the length t1.

The four graphs in FIG. 6 are graphs when the driving condition of the engine 21 satisfies a condition in which the catalyst deterioration diagnosis device 10 is able to diagnose the deterioration state of the catalyst 12. All of the four graphs show constant driving in which the driving condition of the engine 21 scarcely changes. In the leftmost graph among the four graphs, the vehicle speed VS is zero, the engine rotation speed ES is equal to an idling rotation speed, and an average of the Mahalanobis' distances is 5. When the average of the Mahalanobis' distances is 5, because this value is significantly larger than 1 that is a value when the catalyst 12 is normal, the catalyst deterioration diagnosis device 10 is able to diagnose the deterioration state of the catalyst 12 even though the engine rotation speed ES is at the idling rotation speed. In the second graph from the left, the vehicle speed VS is at a value within a low vehicle speed range, and an average of the Mahalanobis' distances is 29. In the third graph from the left, the vehicle speed VS is at a value within a middle vehicle speed range that is higher than the low vehicle speed range, and an average of the Mahalanobis' distances is 90. In the fourth graph from the left, the vehicle speed VS is at a value within a high vehicle speed range that is higher than the middle vehicle speed range, and an average of the Mahalanobis' distances is 117. In this way, the higher the vehicle speed VS is, the larger the value of the Mahalanobis' distance is. As described above, in the specific example, the length of the diagnosis period Td is constant regardless of the length of the cycle of reversal between increasing and decreasing of the fuel amount. On this account, the higher the vehicle speed VS is, the larger the number of times of reversal between increasing and decreasing of the fuel amount during the diagnosis period Td is. Due to this, the diagnosis accuracy is improved.

The invention claimed is:

1. A catalyst deterioration diagnosis device (10) for an engine-including device (1) including:
    an engine (21) having a combustion chamber (22) that exhausts exhaust gas;
    a catalyst (12) which is configured to purify the exhaust gas from the combustion chamber (22) of the engine (21);
    an upstream oxygen concentration sensor (13) provided upstream of the catalyst (12) in a flow direction of the exhaust gas, and configured to output a signal that varies in value depending on whether an air-fuel ratio of an air-fuel mixture is rich or lean and that does not gradually vary when the air-fuel ratio of the air-fuel mixture gradually varies; and
    a downstream oxygen concentration sensor (14) provided downstream of the catalyst (12) in the flow direction of the exhaust gas,
    the catalyst deterioration diagnosis device (10) being configured to diagnose a state of deterioration of the catalyst (12) in accordance with an output signal of the downstream oxygen concentration sensor (14) when the engine (21) is driven so that reversal between increasing and decreasing of a fuel amount supplied to the engine (21) is performed based on reversal of a rich/lean state of an output signal of the upstream oxygen concentration sensor (13), the catalyst deterioration diagnosis device comprising:
    a processor (31); and
    a non-transitory storage medium (32) having programs stored thereon, the processor (31) being configured to execute at least a diagnosis process based on at least one of the programs when, because a cycle of reversal of the rich/lean state of the output signal of the upstream oxygen concentration sensor (13) is disturbed such that the rich/lean state of the output signal of the upstream oxygen concentration sensor (13) is reversed three or more times in a period that is identical in length with a period in which the rich/lean state of the output signal of the upstream oxygen concentration sensor (13) is reversed twice when the cycle of reversal of the rich/lean state of the output signal of the upstream oxygen concentration sensor (13) is normal, a cycle of reversal between increasing and decreasing of the fuel amount is disturbed such that an increasing/decreasing of the fuel amount is reversed three or more times in a period that is identical in length with a period in which the increasing/decreasing of the fuel amount is reversed twice when the reversal between increasing and decreasing of the fuel amount is normal, the diagnosis process being a process of diagnosing the deterioration state of the catalyst (12) based on plural sets of data of the output signal of the downstream oxygen concentration sensor (14) obtained in each unit period during a diagnosis period, the diagnosis period being a duration in which the rich/lean state of the output signal of the upstream oxygen concentration sensor (13) is reversed at least twice when the cycle of reversal of the rich/lean state of the output signal of the upstream oxygen concentration sensor (13) is normal, the diagnosis period having a length with which one driving cycle includes plural diagnosis periods, the sets of data obtained in each unit period during the diagnosis period being not susceptible to an influence of variations including both increase and decrease of the output signal of the downstream oxygen concentration sensor (14), and the output signal of the downstream oxygen concentration sensor (14) being influenced by disturbance of the reversal between increasing and decreasing of the fuel amount.

2. The catalyst deterioration diagnosis device (10) according to claim 1, wherein, a determination value that is obtained from the plural sets of data obtained in each unit period during the diagnosis period and is used for diagnosing the deterioration state of the catalyst (12) is a single value.

3. The catalyst deterioration diagnosis device (10) according to claim 2,
    wherein, the determination value is a value reflecting plural types of characteristic amounts related to a variation of the output signal of the downstream oxygen concentration sensor (14).

4. The catalyst deterioration diagnosis device (10) according to claim 3, wherein, the determination value is a composite index of the plural types of the characteristic amounts.

5. The catalyst deterioration diagnosis device (10) according to claim 1, wherein,
    after a first diagnosis condition is satisfied,
    the state of deterioration of the catalyst (12) is diagnosed based on the output signal of the downstream oxygen concentration sensor (14), after a cycle of reversal between increasing and decreasing of the fuel amount is controlled to fall within a first range by performing diagnosis reversal control of controlling the cycle of reversal between increasing and decreasing of the fuel amount to be a cycle falling within the first range, wherein
    the first diagnosis condition does not include a condition in which the cycle of reversal between increasing and decreasing of the fuel amount falls within the first range.

6. The catalyst deterioration diagnosis device (10) according to claim 1, wherein,
    when control of reversal between increasing and decreasing of the fuel amount to be a cycle falling within a first range is defined as diagnosis reversal control,
    after a second diagnosis condition is satisfied, while the diagnosis reversal control is not being performed, the state of deterioration of the catalyst (12) is diagnosed based on the output signal of the downstream oxygen concentration sensor (14), wherein the second diagnosis condition includes a condition in which the cycle of reversal between increasing and decreasing of the fuel amount falls within a second range that is shorter than the cycle in the first range.

* * * * *